US009376512B2

(12) United States Patent
Crowther et al.

(10) Patent No.: US 9,376,512 B2
(45) Date of Patent: Jun. 28, 2016

(54) PRODUCTION OF VINYL TERMINATED POLYETHYLENE

(71) Applicant: ExxonMobil Chemical Patents Inc., Baytown, TX (US)

(72) Inventors: Donna J. Crowther, Seabrook, TX (US); Patrick Brant, Seabrook, TX (US); John R. Hagadorn, Houston, TX (US); Jacqueline A. Lovell, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 318 days.

(21) Appl. No.: 14/033,847

(22) Filed: Sep. 23, 2013

(65) Prior Publication Data

US 2014/0087987 A1  Mar. 27, 2014

Related U.S. Application Data

(60) Provisional application No. 61/704,604, filed on Sep. 24, 2012.

(51) Int. Cl.
*C08F 110/02* (2006.01)
*C08F 10/02* (2006.01)
*C08F 4/659* (2006.01)
*C08F 4/6592* (2006.01)
*C10M 143/02* (2006.01)
*C10L 1/16* (2006.01)

(52) U.S. Cl.
CPC ............... *C08F 110/02* (2013.01); *C08F 10/02* (2013.01); *C08F 4/65908* (2013.01); *C08F 4/65912* (2013.01); *C08F 4/65927* (2013.01); *C10L 1/1641* (2013.01); *C10M 2205/022* (2013.01)

(58) Field of Classification Search
CPC .... C08F 110/02; C08F 10/02; C08F 4/65908; C08F 4/65912; C08F 4/65927; C10M 2205/022; C10L 1/1641
USPC ............................ 508/591; 526/126, 352, 943
See application file for complete search history.

(56) References Cited

U.S. PATENT DOCUMENTS

| | | | |
|---|---|---|---|
| 4,110,377 A | 8/1978 | Clerici et al. | |
| 5,493,041 A | 2/1996 | Biggs et al. | |
| 5,770,664 A | 6/1998 | Okumura et al. | |
| 6,084,030 A | 7/2000 | Janssen et al. | |
| 6,111,027 A | 8/2000 | Wright et al. | |
| 6,114,445 A | 9/2000 | Tzoganakis et al. | |
| 6,169,154 B1 | 1/2001 | Machida et al. | |
| 7,247,385 B1 | 7/2007 | Tzoganakis et al. | |
| 7,534,848 B2 * | 5/2009 | Resconi | C08F 210/08 526/160 |
| 7,829,495 B2 | 11/2010 | Floyd et al. | |
| 7,943,719 B2 | 5/2011 | Hawker et al. | |
| 8,283,419 B2 | 10/2012 | Hagadorn et al. | |
| 8,372,930 B2 | 2/2013 | Brant et al. | |
| 8,399,725 B2 | 3/2013 | Brant et al. | |
| 8,455,597 B2 * | 6/2013 | Crowther | B01J 31/12 502/103 |
| 8,501,894 B2 | 8/2013 | Crowther et al. | |
| 8,835,563 B2 * | 9/2014 | Crowther | C08F 8/42 525/100 |
| 2005/0032992 A1 | 2/2005 | Floyd et al. | |
| 2010/0168309 A1 | 7/2010 | Mackinnon et al. | |
| 2010/0331505 A1 | 12/2010 | Masino et al. | |
| 2012/0029099 A1 | 2/2012 | Hsieh et al. | |
| 2012/0101235 A1 | 4/2012 | Crowther et al. | |
| 2012/0108765 A1 | 5/2012 | Yang et al. | |
| 2012/0200010 A1 | 8/2012 | Crowther et al. | |
| 2012/0245293 A1 | 9/2012 | Crowther et al. | |
| 2012/0245311 A1 | 9/2012 | Crowther et al. | |
| 2012/0245313 A1 | 9/2012 | Crowther et al. | |

FOREIGN PATENT DOCUMENTS

| | | |
|---|---|---|
| EP | 0 530 408 | 3/1993 |
| EP | 0 802 216 | 10/1997 |
| EP | 1 002 809 | 5/2000 |
| JP | 2007/169340 | 7/2007 |
| JP | 2007/246433 | 9/2007 |
| JP | 2008/050278 | 3/2008 |
| JP | 2012/116871 | 6/2012 |
| WO | WO 98/33842 | 8/1998 |
| WO | WO 01/40324 | 6/2001 |

OTHER PUBLICATIONS

Amin et al., "Versatile Pathways for In Situ Polyolefin Functionalization with Herteroatoms: Catalytic Chain Transfer", Angewandte Chemie International Edition, 2008, 47, pp. 2006-2025.
Bochman, Manfred, "The Chemistry of catalyst activation: the case of group 4 polymerization catalysts", Organometallics, 2010, vol. 29, No. 21, pp. 4711-4740.
Britovsek et al., "Iron and Cobalt Ethylene Polymerization Catalysts Bearing 2,6-Bis(Imino)Pyridyl Ligands: Synthesis, Structures, and Polymerization Studies", Journal of the American Chemical Society, 1999, 121, pp. 8728-8740.
Busico et al., "$^1$H NMR Analysis of Chain Unsaturations in Ethene/ 1-Octene Copolymers Prepared with metallocene Catalysts and High Temperatures", Macromolecules, 2005, vol. 38, No. 16, pp. 6988-06996.
Cancouet et al., "Functional Polysiloxanes. II. Neighboring Effect in the Hydrosiylation of Poly(hydroenmethylsiloxane-co-dimethylsiloxane)s by Allylglycidylether", Journal of Polymer Science Part A: Polymer Chemistry, 2000, vol. 38, No. 5, pp. 837-845.

(Continued)

*Primary Examiner* — James Goloboy
(74) *Attorney, Agent, or Firm* — Renuka Ganesh; Kevin M. Faulkner; Leandro Arechaderra, III

(57) ABSTRACT

This invention relates to processes to produce polyethylene involving contacting ethylene with a metallocene catalyst system; wherein the catalyst system comprises: a stoichiometric activator; and a metallocene compound. The metallocene catalyst system is also disclosed.

17 Claims, No Drawings

(56) References Cited

OTHER PUBLICATIONS

Chung, "Synthesis of Functional polyolefin Copolymers with Graft and Block Structures", Progress in Polymer Science, 2002, vol. 27, pp. 39-85.

Clerici et al., "Catalytic C-Alkylation of Secondary Amines with Alkenes", Synthesis, 1980, vol. 4, pp. 305-306.

Eisenberger et al., "Tantalum-Amidate Complexes for the Hydroaminoalkylation of Secondary Amines. Enhanced Substrate Scope and Enantioselective Chiral Amine Synthesis", Angewandte Chemie International Edition, 2009, 48, pp. 8361-8365.

Herzon et al., "Hydroaminoalkylation of Unactivated Olefins with Dialkylamines", Journal of the American Chemical Society, 2008, vol. 130, No. 45, pp. 14940-14941.

Herzon et al, "Direct, Catalytic Hydroaminoalkylation of Unactivated Olefins with N-Alkyl Arylamines", Journal of the American Chemical Society, 2007, vol. 129, No. 21, pp. 6690-6691.

Huang et al., "The Bridged Cyclopentadienyl Indenyl (fluorenyl) Zirconocene Complexes for Polyethylene Macromonomers", Applied Organometallic Chemistry, 2010, vol. 24, pp. 727-733.

Imanishi, Yukio, et al., "Recent developments in olefin polymerizations with transition metal catalysts", Progress in Polymer Science, 2011, vol. 26, No. 8, pp. 1147-1198.

Kubiak et al., "Titanium-Catalyzed Hydroaminoalkylation of Alkenes by C-H Bond Activation at sp3 Centers in the α-Position to a Nitrogen Atom", Angewandte Chemie International Edition, 2009, vol. 48, No. 6, pp. 1153-1156.

Lehmus et al., "Chain End Isomerization as a Side Reaction in Metallocene-Catalyzed Ethylene and Propylene Polymerizations", Macromolecules, 2000, vol. 33, No. 23, pp. 8534-8540.

Lopez et al., "Synthesis of Well-Defined Polymer Architectures by Successive Catalytic Olefin Polymerization and Living/Controlled Polymerization Reactions", Progress in Polymer Science, 2007, vol. 32, No. 4, pp. 419-454.

Moad, "The Synthesis of Polyolefin Graft Copolymers by Reactive Extrusion", Progress in Polymer Science, 1999, vol. 24, No. 1, pp. 81-142.

Naga, Naofumi, et al, "Effect of co-catalyst system on .alpha.-olefin polymerization with rec-and meso-[dimethylsilylenebis(2,3,5-trimethyl-cyclopentadienyl)]zircomum dichloride", Macromol. Rapid Commun., vol. 18, 1997, pp. 581-589.

Roesky, "Catalytic Hydroaminoalkylation", Angewandte Chemie International Edition, 2009, vol. 48, pp. 4892-4894.

Seayed et al., "Hydroaminomethylation of Olefins Using a Rhodium Carbene Catalyst", Tetrahedron Letters, 2003, vol. 44, No. 8, pp. 1679-1683.

Segawa et al., "Catalytic Hydroaminoalkylation of Alkenes", Yuki Gosei Kagaku Kyokaishi (Journal of Synthetic Organic Chemistry), 2009, vol. 67, No. 8, pp. 843-844.

Suzuki, Noriyuki, et al., "Behavior of metallocene olefin polymerization catalysts under high pressure", Macromolecules, 33(12), pp. 4602-4606.

Turunen, J. et al., "Suppression of Metallocene Catalyst Leaching by the Removal of Free Trimethylaluminium From Methylaluminoxane", Journal of Applied Polymer Science, Col. 100, 2006, pp. 4632-4635.

Yano et al., "Homo- and Copolymerization of Ethylene by Cationic Hafnocene Catalysts Based on Tetrakis(pentafluorophenyl)borate", Macromolecular Chemistry and Physics, 1999, vol. 200, No. 4, pp. 924-932.

* cited by examiner

PRODUCTION OF VINYL TERMINATED POLYETHYLENE

CROSS-REFERENCE TO RELATED APPLICATIONS

This application claims priority to and the benefit of U.S. Provisional Application No. 61/704,604, filed Sep. 24, 2012, the disclosure of which is incorporated herein by reference in its entirety. Also, this application relates to U.S. Provisional Application No. 61/705,057, filed Sep. 24, 2012, U.S. Provisional Application Ser. No. 61/704,606, filed on Sep. 24, 2012; and U.S. Provisional Application Ser. No. 61/704,611, filed on Sep. 24, 2012.

FIELD OF THE INVENTION

This invention relates to homogeneous processes to produce vinyl terminated polyethylene, particularly vinyl terminated ethylene homopolymers and vinyl terminated ethylene copolymers.

BACKGROUND OF THE INVENTION

Polyolefins are the largest-volume family of commercially important, high tonnage thermoplastics and are produced by a worldwide industry with impressive capacity. Even more impressive is the wide range of polymer types and grades that have been obtained from simple starting materials, such as ethylene and propylene. Polyethylene has the world's largest market share among the polyolefins.

Modification of polyethylene is particularly attractive, because it may allow enhancement of existing polyethylene properties and may even confer new properties that may extend application potential. Polyethylene may have a reactive moiety, for example, a vinyl or vinylidene group, that may allow the polyethylene to be functionalized or to be used as macromonomers, allowing them to become further incorporated into another polymer chain. Vinyl groups tend to be more reactive than the more sterically crowded vinylidene groups. Vinyl terminated polyethylenes are therefore desirable. Additionally, polyethylenes that have about one vinyl end group per polymer molecule are even more desirable. If every polyethylene has a reactive moiety capable of being functionalized or otherwise modified, then there would be appreciable cost savings and efficiency in using such a polyethylene. Accordingly, there is a need for vinyl terminated polyethylene, particularly vinyl terminated polyethylene having about one vinyl group per polyethylene molecule.

U.S. Pat. No. 6,169,154 discloses a branched ethylenic macromonomer, derivable from ethylene singly or derivable from ethylene and another olefin, where (a) the molar ratio of a terminal methyl group/a vinyl group is in the range of from 1 to 100, the macromonomer having a branch other than the branch directly derived from the other olefin; (b) a ratio of vinyl groups to the total unsaturated groups in the macromonomer being 70 mol % or more; and (c) a weight average molecular weight of the macromonomer in terms of a polyethylene measured by a GPC being in the range of 100 to 20,000.

Huang et al. (Appl. Organometal. Chem. 2010, 24, pp. 727-733) disclose the synthesis of long-chain branched polyethylene including the generation of vinyl-terminated polyethylene macromonomers, using bridged cyclopentadienyl indenyl(fluorenyl) zirconocenes. The vinyl-terminated polyethylene macromonomers was reported to have a Mn(NMR) in the range of 3,300 to 10,300 g/mol and terminal vinyl percentages of 80.7% to 94.9%.

JP 2012/116871 discloses catalysts for the polymerization of olefins and the manufacture of olefin polymers with good particle shape. These catalysts comprise (a) solid aluminoxanes; (b) organometallic compounds of (b-1) $AlR^5{}_3$ or (b-2) $M^3R^5{}_2$ ($R^5$=H, halo, $C_{1-20}$ hydrocarbyl or alkoxy, $C_{6-20}$ aryloxy, $M^3$=Mg, Zn); and (c) metallocenes of Group 4 metals. Olefin polymers were manufactured by the polymerization of ethylene and comonomers using the catalysts. The catalysts were reported to be useful for the manufacture of vinyl-terminated macromers. Thus, ethylene was polymerized in the presence of aluminoxane, dimethylsilylenebis(cyclopentadienyl)zirconium dichloride, and triisobutylaluminum to give polyethylene reported to have a Mn of 11,500 g/mol, molecular weight distribution of 2.4, and a selectivity of terminal vinyl groups of 0.59.

JP 2008/050278 discloses silylene(cyclopentadienyl)(indenyl)transition metal (Ti, Zr, and Hf) compounds, olefin polymerization catalysts containing them, and the manufacture of polyolefins. Polyolefins having vinyl end groups, useful as macromonomers, were manufactured with these catalysts. In particular, ethylene was polymerized with dimethylsilylene(cyclopentadienyl)(2,4,7-trimethylindenyl) zirconium dichloride, N,N-dimethyloctadecylamine HCl salt-treated hectorite, $Et_3Al$, and (iso-$Bu$)$_3Al$ to give polyethylene reported to have vinyl end groups of 0.07/1000 C atoms.

JP 2007/246433 discloses metallocenes with long hydrocarbyl-containing bridging groups, olefin polymerization catalysts containing them, and manufacture of vinyl-terminated polyolefins. The metallocenes have the structure I, below:

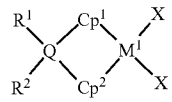

[$M^1$=Ti, Zr, Hf; X=H, halo, $C_{1-20}$ hydrocarbyl, etc.; $Cp^1$, $Cp^2$=(substituted) cyclopentadienyl, (substituted) benzocyclopentadienyl, (substituted) dibenzocyclopentadienyl; substituent for $Cp^1$ and $Cp^2$=halo, $C_{1-20}$ hydrocarbyl, $C_{1-20}$ alkoxy, etc.; $R^1$=$C_{1-40}$ hydrocarbyl; $R^2$=$C_{21-40}$ hydrocarbyl; Q=C, Si, Ge, Sn]. Ethylene was polymerized with I ($R^1$=Me, $R^2$=docosyl, Q=Si, $Cp^1$=$Cp^2$=cyclopentadienyl, $M^1$=Zr, X=Cl), N,N-dimethyloctadecylamine HCl salt-modified hectorite, and (iso-$Pr$)$_3$Al to give polyethylene reported to have a number of vinyl end groups of 0.42/1000 C atoms.

JP 2007/169340 discloses ethylene polymerization in the presence of a catalyst containing (propane-1,3-diyl-biscyclopentadienyl)zirconium dichloride, (iso-$Bu$)$_3$Al, and N,N-dimethyloctadecylamine hydrochloride-modified hectorite to give polyethylene reported to have a number of vinyl end groups of 0.05/1000 C.

EP 0 530 408 discloses vinyl-terminated olefin polymers, reported to have a Mn of 300 to 500,000, manufactured by polymerization of $C_{2-3}$ alkenes in the presence of a reaction product of a polymerization catalyst consisting of a V chelate compound and a dialkylaluminum halide with $CH_2$:CH ($CmH_2m$)CH:$CH_2$ (I, m=1-15), and then reacting with I and a proton donor. Polyethylene, reported to have a Mn of 300 to 300,000 and terminal groups COX [X=OH, $OR_1$, halogen, $SO_3R_2$; $R_1$=$Cl_{-5}$ alkyl; $R_2$=(un)substituted $C_{1-20}$ hydrocarbyl] is obtained by polymerization of $C_2H_4$ in the presence of a dilithio compound. amine complex, followed by reaction with $CO_2$ and a proton donor or sulfonyl halide. Thus, vinyl-terminated ethylene polymer was prepared by polymerization of $C_2H_4$ in the presence of $Et_2AlCl$ (where Et means ethyl) and tris(2-methyl-1,3-butanedionato)vanadium and 1,7-octadiene; for structure proof it was refluxed with a solution of diborane in THF and $Bu_2O$ and treated with aqueous NaOH containing $H_2O_2$. The OH-terminated polymer was then treated with $Me_3SiCl$ in pyridine to give trimethylsiloxy group-terminated polyethylene.

Britovsek et al. (J. Am. Chem. Soc. 1999, 121, pp. 8728-8740) discloses the synthesis, characterization, and ethylene polymerization behavior of a series of iron and cobalt halide complexes, $LMX_n$ (M=Fe, X=Cl, n=2, 3, X=Br, n=2; M=Co, X=Cl, n=2) bearing chelating 2,6-bis(imino)pyridyl ligands L [L=2,6-$(ArNCR^1)_2C_5H_3N$]. X-ray diffraction studies showed the geometry at the metal centers to be either distorted square pyramidal or distorted trigonal bipyramidal. Treatment of the complexes $LMX_n$ with methylaluminoxane (MAO) led to highly active ethylene polymerization catalysts converting ethylene to highly linear polyethylene (PE). $LFeX_2$ precatalysts with ketimine ligands ($R^1$=Me) are approximately an order of magnitude more active than precatalysts with aldimine ligands ($R^1$=H). Catalyst productivities in the range 3,750 to 20,600 g/mmol·h·bar were observed for Fe-based ketimine catalysts, while Co ketimine systems displayed activities of 450 to 1740 g/mmol·h·bar. Molecular weights ($M_w$) of the polymers produced were in the range 14,000 to 611,000. Changing reaction conditions also affected productivity and molecular weight; in some systems, a bimodal molecular weight distribution was observed.

However, few processes have been shown to produce a high percentage of vinyl chain ends, in high yields, with a wide range of molecular weight, and with high catalyst activity for ethylene-based polymerizations. Accordingly, there is need for new processes using catalysts that produce polyethylene polymers having a high percentage of vinyl chain ends, in high yields, with a wide range of molecular weight, with a narrow molecular weight distribution, and with high catalyst activity. Further, there is a need for ethylene-based reactive materials having vinyl terminations which can be functionalized and used in other applications.

SUMMARY OF THE INVENTION

This invention relates to a process to produce polyethylene comprising:
(a) contacting ethylene with a metallocene catalyst system; wherein the catalyst system comprises:
(i) a stoichiometric activator;
(ii) a metallocene compound represented by the formula:

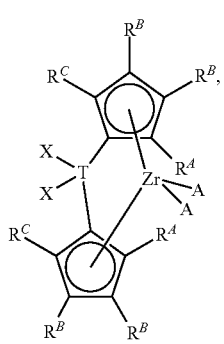

wherein
T is Si or Ge;
each $R^A$ is a $C_1$ to $C_{20}$ substituted or unsubstituted hydrocarbyl group;
each $R^B$ is, independently, H or a $C_1$ to $C_8$ substituted or unsubstituted hydrocarbyl group, or a group represented by the formula —$CH_2R^x$;
wherein $R^x$ is a $C_1$ to $C_{20}$ substituted or unsubstituted hydrocarbyl group, provided that at least one $R^B$ is methyl or a group represented by the formula —$CH_2R^x$;
each $R^C$ is, independently, H or a $C_1$ to $C_{20}$ substituted or unsubstituted hydrocarbyl group;
each A is independently selected from the group consisting of $C_1$ to $C_{20}$ substituted or unsubstituted hydrocarbyl groups, hydrides, amides, amines, alkoxides, sulfides, phosphides, halides, dienes, phosphines, and ethers, and two A groups can form a cyclic structure including aromatic, partially saturated, or saturated cyclic or fused ring system;
each X is, independently, hydrogen, halogen, or a $C_1$ to $C_{20}$ substituted or unsubstituted hydrocarbyl, and two X groups can form a cyclic structure including aromatic, partially saturated, or saturated cyclic or fused ring system;
further provided that any of adjacent $R^A$, $R^B$, and/or $R^C$ groups may form a fused ring or multicenter fused ring systems, where the rings may be substituted or unsubstituted, and may be aromatic, partially unsaturated, or unsaturated;
(b) obtaining a vinyl terminated polyethylene having:
(i) at least 50% allyl chain ends, based on total unsaturations;
(ii) a molecular weight distribution of less than or equal to 4.0;
(iii) a g'(vis) of 0.95 or less; and
(iv) a Mn ($^1$H NMR) of at least 7,000 g/mol.

This invention also relates to a catalyst system comprising:
(i) a stoichiometric activator;
(ii) a metallocene compound represented by the formula:

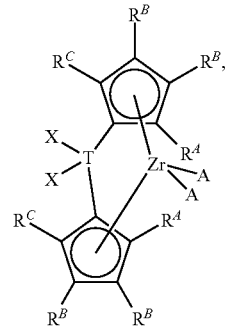

wherein
T is Si or Ge;
each $R^A$ is a $C_1$ to $C_{20}$ substituted or unsubstituted hydrocarbyl group;
each $R^B$ is, independently, H or a $C_1$ to $C_8$ substituted or unsubstituted hydrocarbyl group, or a group represented by the formula —$CH_2R^x$;
wherein $R^x$ is a $C_1$ to $C_{20}$ substituted or unsubstituted hydrocarbyl group, provided that at least one $R^B$ is methyl or a group represented by the formula —$CH_2R^x$;
each $R^C$ is, independently, H or a $C_1$ to $C_{20}$ substituted or unsubstituted hydrocarbyl group;
each A is independently selected from the group consisting of $C_1$ to $C_{20}$ substituted or unsubstituted hydrocarbyl groups, hydrides, amides, amines, alkoxides, sulfides, phosphides, halides, dienes, phosphines, and ethers, and two A groups can form a cyclic structure including aromatic, partially saturated, or saturated cyclic or fused ring system;

each X is, independently, hydrogen, halogen or a $C_1$ to $C_{20}$ substituted or unsubstituted hydrocarbyl, and two X groups can form a cyclic structure including aromatic, partially saturated, or saturated cyclic or fused ring system; and further provided that any of adjacent $R^A$, $R^B$, and/or $R^C$ groups may form a fused ring or multicenter fused ring systems, where the rings may be substituted or unsubstituted, and may be aromatic, partially unsaturated, or unsaturated.

This invention yet further relates to vinyl terminated polyethylenes, having: (i) at least 50% allyl chain ends, based on total unsaturations; (ii) a molecular weight distribution of less than or equal to 4.0; (iii) a g'(vis) of 0.95 or less; (iv) an Mn ($^1$H NMR) of at least 7,000 g/mol; and (iv) a Mn (GPC)/Mn ($^1$H NMR) in the range of from about 0.8 to about 1.2.

This invention also relates to reaction products of the vinyl terminated polyethylene and a modifying agent, wherein the reaction product is a functionalized polyethylene having: (i) at least 50% modified groups, based on the sum of the total unsaturations and modified groups; (ii) a molecular weight distribution of less than or equal to 4.0; and (iii) a g'(vis) of 0.95 or less.

This invention also relates to an article comprising the vinyl terminated polyethylene and/or the functionalized polyethylene.

DETAILED DESCRIPTION

Polyethylenes with high percentage of allyl chain ends (based on total unsaturations) may be produced using supported non-metallocene catalysts comprising metals such as Cr and Fe. However, the molecular weight distribution (MWD) of these polyethylenes is typically very broad. Using metallocenes may produce more narrow MWD polyethylenes, but very few metallocenes have been shown to yield a high percentage of allyl chain ends and have high molecular weights (Mw greater than 10,000 g/ml). For most larger vinyl terminated polyethylenes, the parity between GPC data and NMR data tends to be poor which generally indicates that large amounts of doubly saturated polyethylene chains are produced.

The inventors have advantageously found that through the optimal selection of a metallocene ligand, a metallocene metal, and a stoichiometric activator that polyethylenes having high percentages of allyl chain ends and Mws greater than 10,000 g/mol may be produced. Polyethylenes that have about one vinyl end group per polymer molecule are particularly desirable. If every polyethylene has a reactive moiety capable of being functionalized or otherwise modified, then there would be appreciable cost savings and efficiency in using such a polyethylene.

DEFINITIONS

For the purposes of this invention and the claims thereto, the new numbering scheme for the Periodic Table Groups is used as in CHEMICAL AND ENGINEERING NEWS, 63(5), p. 27 (1985). Therefore, a "Group 4 metal" is an element from Group 4 of the Periodic Table.

"Catalyst productivity" is a measure of how many grams of polymer (P) are produced using a polymerization catalyst comprising W g of catalyst (cat), over a period of time of T hours; and may be expressed by the following formula: P/(T× W) and expressed in units of gP/gcat/hr. "Catalyst activity" is a measure of how many grams of polymer of polymer are produced using a polymerization catalyst comprising W g of catalyst (cat) and may be expressed by the following formula: P/W and expressed in units of gP/g(cat), and is typically used for batch processes. Catalyst activity may be converted to catalyst productivity by taking into account the run time of the batch process: catalyst productivity=catalyst activity/T, where T is the run time in hours.

An "olefin," alternatively referred to as "alkene," is a linear, branched, or cyclic compound of carbon and hydrogen having at least one double bond. For the purposes of this invention and the claims thereto, when a polymer is referred to as "comprising an olefin," the olefin present in the polymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. "Polymer," as used herein, includes oligomers (up to 100 mer units), and larger polymers (greater than 100 mer units).

A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers and the like.

As used herein, "molecular weight" means number average molecular weight (Mn), unless otherwise stated. As used herein, Mn is number average molecular weight (measured by $^1$H NMR, unless stated otherwise), Mw is weight average molecular weight (measured by Gel Permeation Chromatography, GPC), and Mz is z average molecular weight (measured by GPC), wt % is weight percent, mol % is mole percent, vol % is volume percent and mol is mole. Molecular weight distribution (MWD) is defined to be Mw (measured by GPC) divided by Mn (measured by GPC), Mw/Mn.

Mn ($^1$H NMR) is determined according to the NMR methods described below in the Examples section. Mn (GPC) may be determined using a GPC method, as described in the Examples section. For the purpose of the claims, unless otherwise stated, Mn is determined by $^1$H NMR. Unless otherwise noted, all molecular weights (e.g., Mw, Mn, Mz) have units of g/mol.

The unsaturated chain end of inventive polyethylenes comprises an "allyl chain end." An "allyl chain end" is represented by $CH_2CH$—$CH_2$—, as shown in the formula:

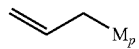

where $M_P$ represents the polymer chain. "Vinyl terminated" as referred to throughout means having an allyl termination. Allyl chain ends are reported as a molar percentage of the total number of mols of unsaturated groups (that is, the sum of allyl chain ends, vinylidene chain ends, vinylene chain ends, and the like). Preferably, the inventive polyethylenes also have a saturated chain end.

The inventors have advantageously found that through the selection of a metallocene compound ligand, a metallocene compound metal and a stoichiometric activator (preferably a non-coordinating anion activator) of a metallocene catalyst system, polyethylenes having high percentages of allyl chain ends, high molecular weights, narrow molecular weight distribution, and long chain branching may be advantageously produced. The metallocene catalyst system, the polymerization process to produce vinyl terminated polyethylenes, the vinyl terminated polyethylenes, and functionalized polyethylenes are discussed below.

Metallocene Catalyst System

Metallocene catalyst systems useful to produce the vinyl terminated polyethylenes disclosed herein comprise zirconocenes, stoichiometric activators (preferably non-coordinating anions, preferably bulky activators), and, optionally, cocatalysts, each of which is described, in turn, below. These components synergistically provide an environment conducive to the production of polyethylenes having high percentages of allyl chain ends, high molecular weights, narrow molecular weight distribution, and long chain branching.

Accordingly, this invention relate to a catalyst system comprising:

(i) a stoichiometric activator (preferably the stoichiometric activator is a bulky ionic stoichiometric activator);
(ii) a metallocene compound represented by the formula:

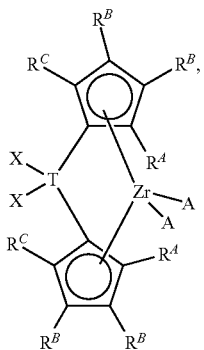

wherein

T is Si or Ge (preferably T is Si);

each $R^A$ is a $C_1$ to $C_{20}$ substituted or unsubstituted hydrocarbyl group (preferably $R^A$ is methyl or ethyl; preferably methyl);

each $R^B$ is, independently, H or a $C_1$ to $C_8$ substituted or unsubstituted hydrocarbyl group, or a group represented by the formula —$CH_2R^x$ (preferably $R^B$ is methyl, n-propyl, n-butyl, benzyl, sec-butyl, or —$CH_2$-cyclopropyl);

wherein $R^x$ is a $C_1$ to $C_{20}$ substituted or unsubstituted hydrocarbyl group, provided that at least one $R^B$ is methyl or a group represented by the formula —$CH_2R^x$ (preferably —$CH_2R^x$ is one of n-propyl, n-butyl, sec-butyl, —$CH_2$-cyclopropyl, or benzyl groups);

each $R^C$ is, independently, H or a $C_1$ to $C_{20}$ substituted or unsubstituted hydrocarbyl group (preferably $R^C$ is H);

each A is independently selected from the group consisting of $C_1$ to $C_{20}$ substituted or unsubstituted hydrocarbyl groups, hydrides, amides, amines, alkoxides, sulfides, phosphides, halides, dienes, phosphines, and ethers, and two A groups can form a cyclic structure including aromatic, partially saturated, or saturated cyclic or fused ring system (preferably A is Cl or methyl);

each X is, independently, hydrogen, halogen or a $C_1$ to $C_{20}$ substituted or unsubstituted hydrocarbyl, and two X groups can form a cyclic structure including aromatic, partially saturated, or saturated cyclic or fused ring system (preferably X is methyl, ethyl, hexyl, silacyclobutyl, or silacyclopentyl);

further provided that any of adjacent $R^A$, $R^B$, and/or $R^C$ groups may form a fused ring or multicenter fused ring systems, where the rings may be substituted or unsubstituted, and may be aromatic, partially unsaturated, or unsaturated (preferably $R^B$ and/or $R^A$ or $R^C$ fuse to form a substituted or unsubstituted indene or a substituted or unsubstituted fluorene; preferably the metallocene compound is not a bis-fluorenyl compound); and (iii) optionally, at least one cocatalyst or scavenger (preferably one or more of trimethylaluminum, triethylaluminum, tri-isobutylaluminum, tri-n-hexylaluminum, tri-n-octylaluminum, diethyl aluminum chloride, dibutyl zinc, and diethyl zinc and the like).

Each of the metallocene compound, the stoichiometric activator and the optional cocatalyst will be discussed, in turn, below.

(i) Metallocenes

A metallocene compound is defined as an organometallic compound with at least one π-bound cyclopentadienyl moiety (or substituted cyclopentadienyl moiety) and more frequently two π-bound cyclopentadienyl-moieties or substituted moieties. This includes other π-bound moieties such as indenyls or fluorenyls or derivatives thereof. The inventors have surprisingly found that the zirconium analogs of useful metallocenes have better activity and produce greater amounts of vinyl chain ends.

Useful metallocene compounds of this invention are represented by the formula:

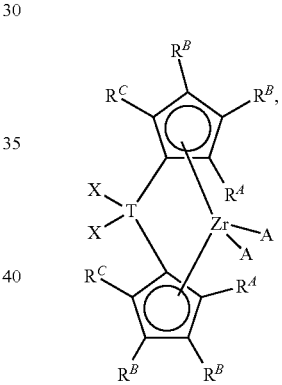

wherein

T is Si or Ge (preferably T is Si); each $R^A$ is a $C_1$ to $C_{20}$ substituted or unsubstituted hydrocarbyl group (preferably $R^A$ is methyl or ethyl; preferably methyl);

each $R^B$ is, independently, H or a $C_1$ to $C_8$ substituted or unsubstituted hydrocarbyl group, or a group represented by the formula —$CH_2R^x$ (preferably $R^B$ is methyl, n-propyl, n-butyl, benzyl, sec-butyl, or —$CH_2$-cyclopropyl);

wherein $R^x$ is a $C_1$ to $C_{20}$ substituted or unsubstituted hydrocarbyl group, provided that at least one $R^B$ is methyl or a group represented by the formula —$CH_2R^x$ (preferably —$CH_2R^x$ is one of n-propyl, n-butyl, sec-butyl, —$CH_2$-cyclopropyl or benzyl groups);

each $R^C$ is, independently, H or a $C_1$ to $C_{20}$ substituted or unsubstituted hydrocarbyl group (preferably $R^C$ is H);

each A is independently selected from the group consisting of $C_1$ to $C_{20}$ substituted or unsubstituted hydrocarbyl groups, hydrides, amides, amines, alkoxides, sulfides, phosphides, halides, dienes, phosphines, and ethers, and two A groups can form a cyclic structure including aromatic, partially saturated, or saturated cyclic or fused ring system (preferably A is Cl or methyl);

each X is, independently, hydrogen, halogen or a $C_1$ to $C_{20}$ substituted or unsubstituted hydrocarbyl, and two X groups can form a cyclic structure including aromatic, partially saturated, or saturated cyclic or fused ring system (preferably X is methyl, ethyl, hexyl, silacyclobutyl, or silacyclopentyl); and further provided that any of adjacent $R^A$, $R^B$, and/or $R^C$ groups may form a fused ring or multicenter fused ring systems, where the rings may be substituted or unsubstituted, and may be aromatic, partially unsaturated, or unsaturated (preferably $R^B$ and/or $R^A$ or $R^C$ fuse to form a substituted or unsubstituted indene or a substituted or unsubstituted fluorene; preferably the metallocene compound is not a bis-fluorenyl compound).

In preferred embodiments, the metallocene compound is asymmetric, which is defined to mean that groups of different sizes are bridged by the $TX_2$ bridge, for example, the metallocene compound may be a bis-cyclopentadienyl-indenyl compound, a bis cyclopentadienyl-fluorenyl compound, a bis-indenyl-fluorenyl compound. In other embodiments, the metallocene compound is symmetric, for example, a bis-indenyl compound.

Preferred metallocene compounds may be represented by the formula:

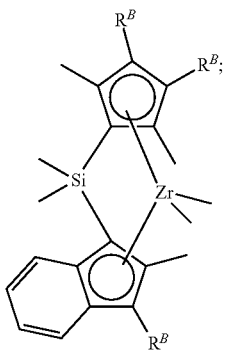

wherein $R^B$ is as defined above.

Particularly preferred metallocene compounds may be represented by the formula:

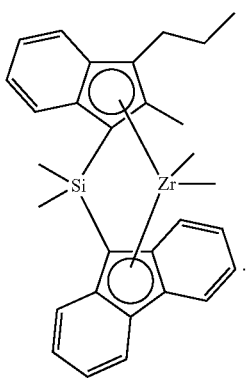

Other preferred metallocenes include: Me$_2$Si(3-n-propylCpMe$_3$)(C$_{13}$H$_8$)ZrCl$_2$; Me$_2$Si(3-n-propylCpMe$_3$)(C$_{13}$H$_8$)ZrMe$_2$; Me$_2$Si(3-n-butylCpMe$_3$)(C$_{13}$H$_8$)ZrCl$_2$; Me$_2$Si(3-n-butylCpMe$_3$)(C$_{13}$H$_8$)ZrMe$_2$; Me$_2$Si(3-benzylCpMe$_3$)(C$_{13}$H$_8$)ZrCl$_2$; Me$_2$Si(3-benzylCpMe$_3$)(C$_{13}$H$_8$)ZrMe$_2$; Me$_2$Si(3-CH$_2$-cyclopropylCpMe$_3$)(C$_{13}$H$_8$)ZrCl$_2$; Me$_2$Si(3-CH$_2$-cyclopropylCpMe$_3$)(C$_{13}$H$_8$)ZrMe$_2$; Me$_2$Ge(3-n-propylCpMe$_3$)(C$_{13}$H$_8$)ZrCl$_2$; Me$_2$Ge(3-n-propylCpMe$_3$)(C$_{13}$H$_8$)ZrMe$_2$; Et$_2$Si(3-n-propylCpMe$_3$)(C$_{13}$H$_8$)ZrCl$_2$; Et$_2$Si(3-n-propylCpMe$_3$)(C$_{13}$H$_8$)ZrMe$_2$; (Hexyl)$_2$Si(3-n-propylCpMe$_3$)(C$_{13}$H$_8$)ZrCl$_2$; (Hexyl)$_2$Si(3-n-propylCpMe$_3$)(C$_{13}$H$_8$)ZrMe$_2$; [(C$_3$H$_6$)Si](3-n-propylCpMe$_3$)(C$_{13}$H$_8$)ZrCl$_2$; [(C$_3$H$_6$)Si](3-n-propylCpMe$_3$)(C$_{13}$H$_8$)ZrMe$_2$; [(C$_4$H$_8$)Si](3-n-propylCpMe$_3$)(C$_{13}$H$_8$)ZrCl$_2$; [(C$_4$H$_8$)Si](3-n-propylCpMe$_3$)(C$_{13}$H$_8$)ZrMe$_2$; Me$_2$Si(CpMe$_4$)(C$_{13}$H$_8$)ZrCl$_2$; Me$_2$Si(CpMe$_4$)(C$_{13}$H$_8$)ZrMe$_2$; Me$_2$Ge(CpMe$_4$)(C$_{13}$H$_8$)ZrCl$_2$; Me$_2$Ge(CpMe$_4$)(C$_{13}$H$_8$)ZrMe$_2$; Et$_2$Si(CpMe$_4$)(C$_{13}$H$_8$)ZrCl$_2$; Et$_2$Si(CpMe$_4$)(C$_{13}$H$_8$)ZrMe$_2$; (Hexyl)$_2$Si(CpMe$_4$)(C$_{13}$H$_8$)ZrCl$_2$; (Hexyl)$_2$Si(CpMe$_4$)(C$_{13}$H$_8$)ZrMe$_2$; [(C$_3$H$_6$)Si](CpMe$_4$)(C$_{13}$H$_8$)ZrCl$_2$; [(C$_3$H$_6$)Si](CpMe$_4$)(C$_{13}$H$_8$)ZrMe$_2$; [(C$_4$H$_8$)Si](CpMe$_4$)(C$_{13}$H$_8$)ZrCl$_2$; [(C$_4$H$_8$)Si](CpMe$_4$)(C$_{13}$H$_8$)ZrMe$_2$; Me$_2$Si(3-n-propylCpMe$_3$)(2,3-Me$_2$C$_9$H$_4$)ZrCl$_2$; Me$_2$Si(3-n-butylCpMe$_3$)(2,3-Me$_2$C$_9$H$_4$)ZrCl$_2$; Me$_2$Si(3-benzylCpMe$_3$)(2,3-Me$_2$C$_9$H$_4$)ZrCl$_2$; Me$_2$Si(3-CH$_2$-cyclopropylCpMe$_3$)(2,3-Me$_2$C$_9$H$_4$)ZrCl$_2$; Me$_2$Ge(3-n-propylCpMe$_3$)(2,3-Me$_2$C$_9$H$_4$)ZrCl$_2$; Et$_2$Si(3-n-propylCpMe$_3$)(2,3-Me$_2$C$_9$H$_4$)ZrCl$_2$; (Hexyl)$_2$Si(3-n-propylCpMe$_3$)(2,3-Me$_2$C$_9$H$_4$)ZrCl$_2$; [(C$_3$H$_6$)Si](3-n-propylCpMe$_3$)(2,3-Me$_2$C$_9$H$_4$)ZrCl$_2$; [(C$_4$H$_8$)Si](3-n-propylCpMe$_3$)(2,3-Me$_2$C$_9$H$_4$)ZrCl$_2$; Me$_2$Si(CpMe$_4$)(2-methyl,3-n-propylC$_9$H$_4$)ZrCl$_2$; Me$_2$Si(CpMe$_4$)(2-methyl,3-n-butylC$_9$H$_4$)ZrCl$_2$; Me$_2$Si(CpMe$_4$)(2-methyl,3-benzylC$_9$H$_4$)ZrCl$_2$; Me$_2$Si(CpMe$_4$)(2-methyl,3-sec-butylC$_9$H$_4$)ZrCl$_2$; Me$_2$Si(CpMe$_4$)(2-methyl,3-CH$_2$-cyclopropylC$_9$H$_4$)ZrCl$_2$; Me$_2$Ge(CpMe$_4$)(2-methyl,3-n-propylC$_9$H$_4$)ZrCl$_2$; Me$_2$Ge(CpMe$_4$)(2-methyl,3-n-butylC$_9$H$_4$)ZrCl$_2$; Me$_2$Ge(CpMe$_4$)(2-methyl,3-benzylC$_9$H$_4$)ZrCl$_2$; Me$_2$Ge(CpMe$_4$)(2-methyl,3-sec-butylC$_9$H$_4$)ZrCl$_2$; Me$_2$Ge(CpMe$_4$)(2-methyl,3-CH$_2$-cyclopropylC$_9$H$_4$)ZrCl$_2$; Et$_2$Si(CpMe$_4$)(2-methyl,3-n-propylC$_9$H$_4$)ZrCl$_2$; Et$_2$Si(CpMe$_4$)(2-methyl,3-n-butylC$_9$H$_4$)ZrCl$_2$; Et$_2$Si(CpMe$_4$)(2-methyl,3-benzylC$_9$H$_4$)ZrCl$_2$; Et$_2$Si(CpMe$_4$)(2-methyl,3-sec-butylC$_9$H$_4$)ZrCl$_2$; Et$_2$Si(CpMe$_4$)(2-methyl,3-CH$_2$-cyclopropylC$_9$H$_4$)ZrCl$_2$; (Hexyl)$_2$Si(CpMe$_4$)(2-methyl,3-n-propylC$_9$H$_4$)ZrCl$_2$; (Hexyl)$_2$Si(CpMe$_4$)(2-methyl,3-n-butylC$_9$H$_4$)ZrCl$_2$; (Hexyl)$_2$Si(CpMe$_4$)(2-methyl,3-benzylC$_9$H$_4$)ZrCl$_2$; (Hexyl)$_2$Si(CpMe$_4$)(2-methyl,3-sec-butylC$_9$H$_4$)ZrCl$_2$; (Hexyl)$_2$Si(CpMe$_4$)(2-methyl,3-CH$_2$-cyclopropylC$_9$H$_4$)ZrCl$_2$; [(C$_3$H$_6$)Si](CpMe$_4$)(2-methyl,3-n-propylC$_9$H$_4$)ZrCl$_2$; [(C$_3$H$_6$)]Si(CpMe$_4$)(2-methyl,3-n-butylC$_9$H$_4$)ZrCl$_2$; [(C$_3$H$_6$)Si](CpMe$_4$)(2-methyl,3-benzylC$_9$H$_4$)ZrCl$_2$; [(C$_3$H$_6$)Si](CpMe$_4$)(2-methyl,3-sec-butylC$_9$H$_4$)ZrCl$_2$; [(C$_3$H$_6$)Si](CpMe$_4$)(2-methyl,3-CH$_2$-cyclopropylC$_9$H$_4$)ZrCl$_2$; [(C$_4$H$_8$)Si](CpMe$_4$)(2-methyl,3-n-propylC$_9$H$_4$)ZrCl$_2$; [(C$_4$H$_8$)]Si (CpMe$_4$)(2-methyl,3-n-butylC$_9$H$_4$)ZrCl$_2$; [(C$_4$H$_8$)Si](CpMe$_4$)(2-methyl,3-benzylC$_9$H$_4$)ZrCl$_2$; [(C$_4$H$_8$)Si](CpMe$_4$)(2-methyl,3-sec-butylC$_9$H$_4$)ZrCl$_2$; [(C$_4$H$_8$)Si](CpMe$_4$)(2-methyl,3-CH$_2$-cyclopropylC$_9$H$_4$)ZrCl$_2$; Me$_2$Si(3-n-propylCpMe$_3$)(CpMe$_4$)ZrCl$_2$; Me$_2$Si(3-n-propylCpMe$_3$)(CpMe$_4$)ZrMe$_2$; Me$_2$Si(3-n-butylCpMe$_3$)(CpMe$_4$)ZrCl$_2$; Me$_2$Si(3-n-butylCpMe$_3$)(CpMe$_4$)ZrMe$_2$; Me$_2$Si(3-benzylCpMe$_3$)(CpMe$_4$)ZrCl$_2$; Me$_2$Si(3-benzylCpMe$_3$)(CpMe$_4$)ZrMe$_2$; Me$_2$Si(3-CH$_2$-cyclopropylCpMe$_3$)(CpMe$_4$)ZrCl$_2$; Me$_2$Si(3-CH$_2$-cyclopropylCpMe$_3$)(CpMe$_4$)ZrMe$_2$; Me$_2$Ge(3-n-propylCpMe$_3$)(CpMe$_4$)ZrCl$_2$; Me$_2$Ge(3-n-propylCpMe$_3$)(CpMe$_4$)ZrMe$_2$; Et$_2$Si(3-n-propylCpMe$_3$)(CpMe$_4$)ZrCl$_2$; Et$_2$Si(3-n-propylCpMe$_3$)(CpMe$_4$)ZrMe$_2$; (Hexyl)$_2$Si(3-n-propylCpMe$_3$)(CpMe$_4$)ZrCl$_2$; (Hexyl)$_2$Si(3-n-propylCpMe$_3$)(CpMe$_4$)ZrMe$_2$; [(C$_3$H$_6$)Si](3-n-propylCpMe$_3$)(CpMe$_4$)ZrCl$_2$; [(C$_3$H$_6$)Si](3-n-propylCpMe$_3$)(CpMe$_4$)ZrMe$_2$; [(C$_4$H$_8$)Si](3-n-propylCpMe$_3$)(CpMe$_4$)ZrCl$_2$; [(C$_4$H$_8$)Si](3-n-propylCpMe$_3$)(CpMe$_4$)ZrMe$_2$; rac-Me$_2$Si(2-Me,3-n-propylC$_9$H$_4$ (2,3-Me$_2$C$_9$H$_4$)ZrCl$_2$; rac-Me$_2$Si(2-Me,3-n-propylC$_9$H$_4$)$_2$ZrCl$_2$; rac-Me$_2$Si(2-Me,3-n-butylC$_9$H$_4$)(2,3-Me$_2$C$_9$H$_4$)ZrCl$_2$; rac-Me$_2$Si(2-Me,3-n-butylC$_9$H$_4$)$_2$ZrCl$_2$; rac-Me$_2$Si(2-Me,3-CH$_2$-cyclopropylC$_9$H$_4$)(2,3-Me$_2$C$_9$H$_4$)ZrCl$_2$; rac-Me$_2$Si (2-Me,3-CH$_2$-cyclopropylC$_9$H$_4$)$_2$ZrCl$_2$; rac-Me$_2$Ge(2-Me,3-n-propylC$_9$H$_4$)(2,3-Me$_2$C$_9$H$_4$)ZrCl$_2$; rac-Me$_2$Ge(2-Me,3-n-propylC$_9$H$_4$)$_2$ZrCl$_2$; rac-Et$_2$Si(2-Me,3-n-propylC$_9$H$_4$)(2,3-Me$_2$C$_9$H$_4$)ZrCl$_2$; Et$_2$Si(2-Me,3-n-propylC$_9$H$_4$)$_2$ZrCl$_2$; rac-(Hexyl)$_2$Si(2-Me,3-n-propylC$_9$H$_4$)(2,3-Me$_2$C$_9$H$_4$)ZrCl$_2$; rac-(Hexyl)$_2$Si(2-Me,3-n-propylC$_9$H$_4$)$_2$ZrCl$_2$; rac-[(C$_3$H$_6$)Si](2-Me,3-n-propylC$_9$H$_4$)(2,3-Me$_2$C$_9$H$_4$)ZrCl$_2$; rac-[(C$_3$H$_6$)Si](2-Me,3-n-propylC$_9$H$_4$)$_2$ZrCl$_2$; rac-[(C$_4$H$_8$)Si](2-Me,3-n-propylC$_9$H$_4$)(2,3-Me$_2$C$_9$H$_4$)ZrCl$_2$; rac-[(C$_4$H$_8$)Si](2-Me,3-n-propylC$_9$H$_4$)$_2$ZrCl$_2$; Me$_2$Si(C$_{13}$H$_8$)(2-methyl,3-n-propylC$_9$H$_4$)ZrCl$_2$; Me$_2$Si(C$_{13}$H$_8$)(2-methyl,3-n-butylC$_9$H$_4$)ZrCl$_2$; Me$_2$Si(C$_{13}$H$_8$)(2-methyl,3-benzylC$_9$H$_4$)ZrCl$_2$; Me$_2$Si(C$_{13}$H$_8$)(2-methyl,3-sec-butylC$_9$H$_4$)ZrCl$_2$; Me$_2$Si(C$_{13}$H$_8$)(2-methyl,3-CH$_2$-cyclopropylC$_9$H$_4$)ZrCl$_2$; Me$_2$Ge(C$_{13}$H$_8$)(2-methyl,3-n-propylC$_9$H$_4$)ZrCl$_2$; Me$_2$Ge(C$_{13}$H$_8$)(2-methyl,3-n-butylC$_9$H$_4$)ZrCl$_2$; Me$_2$Ge(C$_{13}$H$_8$)(2-methyl,3-benzylC$_9$H$_4$)ZrCl$_2$; Me$_2$Ge(C$_{13}$H$_8$)(2-methyl,3-sec-butylC$_9$H$_4$)ZrCl$_2$; Me$_2$Ge(C$_{13}$H$_8$)(2-methyl,3-CH$_2$-cyclopropylC$_9$H$_4$)ZrCl$_2$; Et$_2$Si(C$_{13}$H$_8$)(2-methyl,3-n-propylC$_9$H$_4$)ZrCl$_2$; Et$_2$Si(C$_{13}$H$_8$)(2-methyl,3-n-butylC$_9$H$_4$)ZrCl$_2$; Et$_2$Si(C$_{13}$H$_8$)(2-methyl,3-benzylC$_9$H$_4$)ZrCl$_2$; Et$_2$Si(C$_{13}$H$_8$)(2-methyl,3-sec-butylC$_9$H$_4$)ZrCl$_2$; Et$_2$Si(C$_{13}$H$_8$)(2-methyl,3-CH$_2$-cyclopropylC$_9$H$_4$)ZrCl$_2$; (Hexyl)$_2$Si(C$_{13}$H$_8$)(2-methyl,3-n-propylC$_9$H$_4$)ZrCl$_2$; (Hexyl)$_2$Si(C$_{13}$H$_8$)(2-methyl,3-n-butylC$_9$H$_4$)ZrCl$_2$; (Hexyl)$_2$Si(C$_{13}$H$_8$)(2-methyl,3-benzylC$_9$H$_4$)ZrCl$_2$; (Hexyl)$_2$Si(C$_{13}$H$_8$)(2-methyl,3-sec-butylC$_9$H$_4$)ZrCl$_2$; (Hexyl)$_2$Si(C$_{13}$H$_8$)(2-methyl,3-CH$_2$-cyclopropylC$_9$H$_4$)ZrCl$_2$; [(C$_3$H$_6$)Si](C$_{13}$H$_8$)(2-methyl,3-n-propylC$_9$H$_4$)ZrCl$_2$; [(C$_3$H$_6$)]Si(C$_{13}$H$_8$)(2-methyl,3-n-butylC$_9$H$_4$)ZrCl$_2$; [(C$_3$H$_6$)Si](C$_{13}$H$_8$)(2-methyl,3-benzylC$_9$H$_4$)ZrCl$_2$; [(C$_3$H$_6$)Si](C$_{13}$H$_8$)(2-methyl,3-sec-butylC$_9$H$_4$)ZrCl$_2$; [(C$_3$H$_6$)Si](C$_{13}$H$_8$)(2-methyl,3-CH$_2$-cyclopropylC$_9$H$_4$)ZrCl$_2$; [(C$_4$H$_8$)Si](C$_{13}$H$_8$)(2-methyl,3-n-propylC$_9$H$_4$)ZrCl$_2$; [(C$_4$H$_8$)Si(C$_{13}$H$_8$)(2-methyl,3-n-butylC$_9$H$_4$)ZrCl$_2$; [(C$_4$H$_8$)Si](C$_{13}$H$_8$)(2-methyl,3-benzylC$_9$H$_4$)ZrCl$_2$; [(C$_4$H$_8$)Si](C$_{13}$H$_8$)(2-methyl,3-sec-butylC$_9$H$_4$)ZrCl$_2$; [(C$_4$H$_8$)Si](C$_{13}$H$_8$)(2-methyl,3-CH$_2$-cyclopropylC$_9$H$_4$)ZrCl$_2$; and zirconium dimethyl analogs of the above zirconium dichloride compounds wherein the Cl groups on the Zr are replaced with CH$_3$ groups; wherein Me is methyl; Et is ethyl; C$_9$H$_4$ is an indenyl group; C$_{13}$H$_8$ is a fluorenyl group; [(C$_3$H$_6$)Si] is silacyclobutyl bridge; and [(C$_4$H$_8$)Si] is silacyclopentyl bridge.

(ii) Stoichiometric Activators

The catalyst system of this invention further comprises one or more stoichiometric activators. A stoichiometric activator is a non-alumoxane compound which when combined in a reaction with the metallocene compound forms a catalytically active species at a molar ratio of stoichiometric activator to metallocene compound of 10:1 or less (preferably 5:1, more preferably 2:1, or even more preferably 1:1). It is within the scope of this invention to use a molar ratio of stoichiometric activator to metallocene compound of greater than 10:1. However, one of skill in the art would appreciate that the stoichiometric activator would be in excess, and that a catalytically active species may be obtained using a molar ratio of stoichiometric activator to metallocene compound of 10:1 or less.

The typical stoichiometric (or non-alumoxane) activator-to-catalyst ratio is a 1:1 molar ratio. A particularly useful range is from 0.5:1 to 10:1, preferably 1:1 to 5:1. Alternate preferred ranges include from 0.1:1 to 100:1, alternately from 0.5:1 to 200:1, alternately from 1:1 to 500:1 alternately from 1:1 to 1000:1.

Stoichiometric activators are non-alumoxane compounds which may be neutral or ionic, such as tri(n-butyl)ammonium tetrakis(pentafluorophenyl)borate, a tris perfluorophenyl boron metalloid precursor, or a tris perfluoronaphthyl boron metalloid precursor, polyhalogenated heteroborane anions (WO 98/43983), boric acid (U.S. Pat. No. 5,942,459), or a combination thereof. It is also within the scope of this invention to use stoichiometric activators alone or in combination with alumoxane or modified alumoxane activators.

Neutral Stoichiometric Activators

Examples of neutral stoichiometric activators include tri-substituted boron, tellurium, aluminum, gallium and indium or mixtures thereof. The three substituent groups are each independently selected from alkyls, alkenyls, halogens, substituted alkyls, aryls, arylhalides, alkoxy, and halides. Preferably, the three groups are independently selected from halogen, mono or multicyclic (including halosubstituted) aryls, alkyls, and alkenyl compounds, and mixtures thereof, preferred are alkenyl groups having 1 to 20 carbon atoms, alkyl groups having 1 to 20 carbon atoms, alkoxy groups having 1 to 20 carbon atoms, and aryl groups having 3 to 20 carbon atoms (including substituted aryls). More preferably, the three groups are alkyls having 1 to 4 carbon groups, phenyl, naphthyl, or mixtures thereof. Even more preferably, the three groups are halogenated, preferably fluorinated, aryl groups. Most preferably, the neutral stoichiometric activator is tris perfluorophenyl boron or tris perfluoronaphthyl boron.

Ionic Stoichiometric Activators

Ionic stoichiometric activators may contain an active proton, or some other cation associated with, but not coordinated to, or only loosely coordinated to, the remaining anion of the activator. Such compounds and the like are described in EP 0 570 982 A; EP 0 520 732 A; EP 0 495 375 A; EP 0 500 944 B1; EP 0 277 003 A; EP 0 277 004 A; U.S. Pat. Nos. 5,153,157; 5,198,401; 5,066,741; 5,206,197; 5,241,025; 5,384,299; and 5,502,124; all of which are herein fully incorporated by reference.

Ionic stoichiometric activators comprise a cation, which is preferably a Bronsted acid capable of donating a proton, and a compatible non-coordinating anion. Preferably, the anion is relatively large (bulky), capable of stabilizing the catalytically active species (preferably a group 4 catalytically active species) which is formed when the metallocene compound and the stoichiometric activator are combined. Preferably the anion will be sufficiently labile to be displaced by olefinic, diolefinic and acetylenically unsaturated substrates or other neutral Lewis bases, such as ethers, amines, and the like. Two classes of compatible non-coordinating anions have been disclosed in EP 0 277,003 A and EP 0 277,004 A: 1) anionic coordination complexes comprising a plurality of lipophilic radicals covalently coordinated to and shielding a central charge-bearing metal or metalloid core, and 2) anions comprising a plurality of boron atoms, such as carboranes, metallacarboranes, and boranes.

Ionic stoichiometric activators comprise an anion, preferably a non-coordinating anion. The term "non-coordinating anion" (NCA) means an anion which either does not coordinate to said cation or which is only weakly coordinated to said cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Non-coordinating anions useful in accordance with this invention are those that are compatible, stabilize the metallocene cation in the sense of balancing its ionic charge at +1, yet retain sufficient lability to permit displacement by an ethylenically or acetylenically unsaturated monomer during polymerization.

In a preferred embodiment of this invention, the ionic stoichiometric activators are represented by the following formula (I):

$$(Z)_d^+ A^{d-} \qquad (1)$$

wherein $(Z)_d^+$ is the cation component and $A^{d-}$ is the anion component; where Z is (L-H) or a reducible Lewis Acid, L is an neutral Lewis base; H is hydrogen; (L-H)$^+$ is a Bronsted acid; $A^{d-}$ is a non-coordinating anion having the charge d−; and d is an integer from 1 to 3.

When Z is (L-H) such that the cation component is $(L-H)_d^+$, the cation component may include Bronsted acids such as protonated Lewis bases capable of protonating a moiety, such as an alkyl or aryl, from the bulky ligand metallocene containing transition metal catalyst precursor, resulting in a cationic transition metal species. Preferably, the activating cation $(L-H)_d^+$ is a Bronsted acid, capable of donating a proton to the transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers, such as dimethyl ether diethyl ether, tetrahydrofuran, and dioxane, sulfoniums from thioethers, such as diethyl thioethers and tetrahydrothiophene, and mixtures thereof.

When Z is a reducible Lewis acid, $(Z)_d^+$ is preferably represented by the formula: $(Ar_3C)^+$, where Ar is aryl or aryl substituted with a heteroatom, a $C_1$ to $C_{40}$ hydrocarbyl, or a substituted $C_1$ to $C_{40}$ hydrocarbyl, preferably $(Z)_d^+$ is represented by the formula: $(Ph_3C)^+$, where Ph is phenyl or phenyl substituted with a heteroatom, a $C_1$ to $C_{40}$ hydrocarbyl, or a substituted $C_1$ to $C_{40}$ hydrocarbyl. In a preferred embodiment, the reducible Lewis acid is triphenyl carbenium.

The anion component $A^{d-}$ includes those having the formula $[M^{k+}Q_n]^{d-}$ wherein k is 1, 2, or 3; n is 1, 2, 3, 4, 5, or 6, preferably 3, 4, 5 or 6; (n−k)=d; M is an element selected from group 13 of the Periodic Table of the Elements, preferably boron or aluminum; and each Q is, independently, a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than one occurrence is Q a halide, and two Q groups may form a ring structure. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ components also include diboron compounds as disclosed in U.S. Pat. No. 5,447,895, which is fully incorporated herein by reference.

In other embodiments of this invention, the ionic stoichiometric activator may be an activator comprising expanded anions, represented by the formula:

$$(A^{*+a})_b (Z^*J^*_j)^{-c}{}_d;$$

wherein A* is a cation having charge +a; Z* is an anion group of from 1 to 50 atoms not counting hydrogen atoms, further containing two or more Lewis base sites; J* independently each occurrence is a Lewis acid coordinated to at least one Lewis base site of Z*, and optionally two or more such J* groups may be joined together in a moiety having multiple Lewis acid functionality; J is a number from 2 to 12; and a, b, c, and d are integers from 1 to 3, with the proviso that a×b is equal to c×d. Examples of such activators comprising expandable anions may be found in U.S. Pat. No. 6,395,671, which is fully incorporated herein by reference.

Examples of ionic stoichiometric activators useful in the catalyst system of this invention are: trimethylammonium tetraphenylborate, triethylammonium tetraphenylborate, tripropylammonium tetraphenylborate, tri(n-butyl)ammonium tetraphenylborate, tri(t-butyl)ammonium tetraphenylborate, N,N-dimethylanilinium tetraphenylborate, N,N-diethylanilinium tetraphenylborate, N,N-dimethyl-(2,4,6-trimethylanilinium)tetraphenylborate, tropillium tetraphenylborate, triphenylcarbenium tetraphenylborate, triphenylphosphonium tetraphenylborate triethylsilylium tetraphenylborate, benzene(diazonium)tetraphenylborate, trimethylammonium tetrakis(pentafluorophenyl)borate, triethylammonium tetrakis(pentafluorophenyl)borate, tripropylammonium tetrakis(pentafluorophenyl)borate, tri (n-butyl)ammonium tetrakis(pentafluorophenyl)borate, tri (sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl-(2,4,6-trimethylanilinium)tetrakis(pentafluorophenyl)borate, tropillium tetrakis(pentafluorophenyl)borate, triphenylcarbenium tetrakis(pentafluorophenyl)borate, triphenylphosphonium tetrakis(pentafluorophenyl)borate, triethylsilylium tetrakis(pentafluorophenyl)borate, benzene (diazonium)tetrakis(pentafluorophenyl)borate, trimethylammonium tetrakis-(2,3,4,6-tetrafluorophenyl)borate, triethylammonium tetrakis-(2,3,4,6-tetrafluorophenyl)borate, tripropylammonium tetrakis-(2,3,4,6-tetrafluorophenyl)borate, tri(n-butyl)ammonium tetrakis-(2,3,4,6-tetrafluorophenyl)borate, dimethyl(t-butyl)ammonium tetrakis-(2,3,4,6-tetrafluorophenyl)borate, N,N-dimethylanilinium tetrakis-(2,3,4,6-tetrafluorophenyl)borate, N,N-diethylanilinium tetrakis-(2,3,4,6-tetrafluorophenyl)borate, N,N-dimethyl-(2,4,6-trimethylanilinium)tetrakis-(2,3,4,6-tetrafluorophenyl) borate, tropillium tetrakis-(2,3,4,6-tetrafluorophenyl)borate, triphenylcarbenium tetrakis-(2,3,4,6-tetrafluorophenyl)borate, triphenylphosphonium tetrakis-(2,3,4,6-tetrafluorophenyl)borate, triethylsilylium tetrakis-(2,3,4,6-tetrafluorophenyl)borate, benzene(diazonium)tetrakis-(2,3,4,6-tetrafluorophenyl)borate, trimethylammonium tetrakis (perfluoronaphthyl)borate, triethylammonium tetrakis (perfluoronaphthyl)borate, tripropylammonium tetrakis (perfluoronaphthyl)borate, tri(n-butyl)ammonium tetrakis (perfluoronaphthyl)borate, tri(t-butyl)ammonium tetrakis (perfluoronaphthyl)borate, N,N-dimethylanilinium tetrakis (perfluoronaphthyl)borate, N,N-diethylanilinium tetrakis (perfluoronaphthyl)borate, N,N-dimethyl-(2,4,6-trimethylanilinium)tetrakis(perfluoronaphthyl)borate, tropillium tetrakis(perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene(diazonium)tetrakis (perfluoronaphthyl)borate, trimethylammonium tetrakis (perfluorobiphenyl)borate, triethylammonium tetrakis (perfluorobiphenyl)borate, tripropylammonium tetrakis (perfluorobiphenyl)borate, tri(n-butyl)ammonium tetrakis (perfluorobiphenyl)borate, tri(t-butyl)ammonium tetrakis (perfluorobiphenyl)borate, N,N-dimethylanilinium tetrakis (perfluorobiphenyl)borate, N,N-diethylanilinium tetrakis (perfluorobiphenyl)borate, N,N-dimethyl-(2,4,6-trimethylanilinium)tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium)tetrakis (perfluorobiphenyl)borate, trimethylammonium tetrakis(3,5-bis(trifluoromethyl)phenyl)borate, triethylammonium tetrakis(3,5-bis(trifluoromethyl)phenyl)borate, tripropylammonium tetrakis(3,5-bis(trifluoromethyl)phenyl)borate, tri(n-butyl)ammonium tetrakis(3,5-bis(trifluoromethyl)phenyl)borate, tri(t-butyl)ammonium tetrakis(3,5-bis(trifluoromethyl)phenyl)borate, N,N-dimethylanilinium tetrakis(3,5-bis(trifluoromethyl)phenyl)borate, N,N-diethylanilinium tetrakis(3,5-bis(trifluoromethyl)phenyl)borate, N,N-dimethyl-(2,4,6-trimethylanilinium)tetrakis(3,5-bis(trifluoromethyl)phenyl)borate, tropillium tetrakis(3,5-bis(trifluoromethyl)phenyl)borate, triphenylcarbenium tetrakis(3,5-bis(trifluoromethyl)phenyl)borate, triphenylphosphonium tetrakis(3,5-bis(trifluoromethyl)phenyl)borate, triethylsilylium tetrakis(3,5-bis(trifluoromethyl)phenyl)borate, benzene(diazonium)tetrakis(3,5-bis(trifluoromethyl)phenyl)borate, and dialkyl ammonium salts such as: di-(i-propyl)ammonium tetrakis(pentafluorophenyl)borate, and dicyclohexylammonium tetrakis(pentafluorophenyl)borate; and additional trisubstituted phosphonium salts such as tri(o-tolyl)phosphonium tetrakis(pentafluorophenyl)borate, and tri(2,6-dimethylphenyl)phosphonium tetrakis(pentafluorophenyl)borate.

Most preferably, the ionic stoichiometric activator is N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, or triphenylcarbenium tetrakis(perfluorophenyl)borate.

Bulky Ionic Stoichiometric Activators

"Bulky activator" as used herein refers to ionic stoichiometric activators represented by the formula:

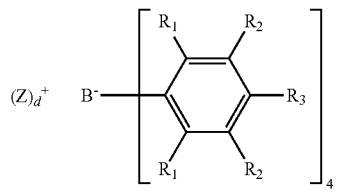

where:
each $R_1$ is, independently, a halide, preferably a fluoride;
each $R_2$ is, independently, a halide, a $C_6$ to $C_{20}$ substituted aromatic hydrocarbyl group or a siloxy group of the formula —O—Si—$R_a$, where $R_a$ is a $C_1$ to $C_{20}$ substituted or unsubstituted hydrocarbyl or hydrocarbylsilyl group (preferably $R_2$ is a fluoride or a perfluorinated phenyl group);
each $R_3$ is a halide, $C_6$ to $C_{20}$ substituted aromatic hydrocarbyl group or a siloxy group of the formula —O—Si—$R_a$, where $R_a$ is a $C_1$ to $C_{20}$ substituted or unsubstituted hydrocarbyl or hydrocarbylsilyl group (preferably $R_3$ is a fluoride or a $C_6$ perfluorinated aromatic hydrocarbyl group); wherein $R_2$ and $R_3$ can form one or more saturated or unsaturated, substituted or unsubstituted rings (preferably $R_2$ and $R_3$ form a perfluorinated phenyl ring);
$(Z)_d^+$ is the cation component; where Z is (L-H) or a reducible Lewis Acid, L is an neutral Lewis base; H is hydrogen; $(L-H)^+$ is a Bronsted acid; and d is an integer from 1 to 3;
wherein the boron anion component has a molecular weight of greater than 1020 g/mol; and wherein at least three of the substituents on the B atom each have a molecular volume of greater than 250 cubic Å, alternately greater than 300 cubic Å, or alternately greater than 500 cubic Å.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple 'Back of the Envelope' Method for Estimating the Densities and Molecular Volumes of Liquids and Solids," Journal of Chemical Education, Vol. 71, No. 11, November 1994, pp. 962-964. Molecular volume (MV), in units of cubic Å, is calculated using the formula: $MV=8.3V_s$, where $V_s$ is the scaled volume. $V_s$ is the sum of the relative volumes of the constituent atoms, and is calculated from the molecular formula of the substituent using the following table of relative volumes. For fused rings, the $V_s$ is decreased by 7.5% per fused ring.

| Element | Relative Volume |
|---|---|
| H | 1 |
| $1^{st}$ short period, Li to F | 2 |
| $2^{nd}$ short period, Na to Cl | 4 |
| $1^{st}$ long period, K to Br | 5 |
| $2^{nd}$ long period, Rb to I | 7.5 |
| $3^{rd}$ long period, Cs to Bi | 9 |

Exemplary bulky substituents of activators suitable herein and their respective scaled volumes and molecular volumes are shown in the table below. The dashed bonds indicate binding to boron, as in the general formula above.

| Activator | Structure of boron substituents | Molecular Formula of each substituent | $V_s$ | MV Per subst. (Å³) | Total MV (Å³) |
|---|---|---|---|---|---|
| Dimethylanilinium tetrakis(perfluoronaphthyl)borate | 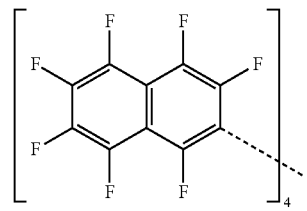 | $C_{10}F_7$ | 34 | 261 | 1044 |

| Activator | Structure of boron substituents | Molecular Formula of each substituent | $V_s$ | MV Per subst. (Å³) | Total MV (Å³) |
|---|---|---|---|---|---|
| Dimethylanilinium tetrakis(perfluorobiphenyl)borate | | $C_{12}F_9$ | 42 | 349 | 1396 |
| [4-tButyl-PhNMe$_2$H] [(C$_6$F$_3$(C$_6$F$_5$)$_2$)$_4$B] | | $C_{18}F_{13}$ | 62 | 515 | 2060 |

Exemplary bulky ionic stoichiometric activators useful in catalyst systems herein include: trimethylammonium tetrakis(perfluoronaphthyl)borate, triethylammonium tetrakis(perfluoronaphthyl)borate, tripropylammonium tetrakis(perfluoronaphthyl)borate, tri(n-butyl)ammonium tetrakis(perfluoronaphthyl)borate, tri(t-butyl)ammonium tetrakis(perfluoronaphthyl)borate, N,N-dimethylanilinium tetrakis(perfluoronaphthyl)borate, N,N-diethylanilinium tetrakis(perfluoronaphthyl)borate, N,N-dimethyl-(2,4,6-trimethylanilinium)tetrakis(perfluoronaphthyl)borate, tropillium tetrakis(perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene(diazonium)tetrakis(perfluoronaphthyl)borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(t-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium)tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium)tetrakis(perfluorobiphenyl)borate, [4-t-butyl-PhNMe$_2$H][(C$_6$F$_3$(C$_6$F$_5$)$_2$)$_4$B], (where Ph is phenyl and Me is methyl), and the types disclosed in U.S. Pat. No. 7,297,653.

In another embodiment of this invention, an activation method using ionic compounds not containing an active proton but capable of producing a bulky ligand metallocene catalyst cation and their non-coordinating anion are also contemplated, and are described in EP 0 426 637 A, EP 0 573 403 A, and U.S. Pat. No. 5,387,568, which are all herein incorporated by reference.

In another embodiment of this invention, inventive processes also can employ stoichiometric activator compounds that are initially neutral Lewis acids but form a cationic metal complex and a noncoordinating anion, or a zwitterionic complex upon reaction with the metallocene compounds. For example, tris(pentafluorophenyl) boron or aluminum may act to abstract a hydrocarbyl or hydride ligand to yield an invention cationic metal complex and stabilizing noncoordinating anion, see EP 0 427 697 A and EP 0 520 732 A for illustrations of analogous group 4 metallocene compounds. Also, see the methods and compounds of EP 0 495 375 A. For formation of zwitterionic complexes using analogous group 4 compounds, see U.S. Pat. Nos. 5,624,878; 5,486,632; and 5,527,929.

In another embodiment of this invention, another suitable ionic stoichiometric activator comprises a salt of a cationic oxidizing agent and a noncoordinating, compatible anion represented by the formula:

$$(X^{e+})_d(A^{d-})_e \quad (3)$$

wherein $X^{e+}$ is a cationic oxidizing agent having a charge of e+; e is 1, 2, or 3; $A^{d-}$ is a non-coordinating anion having the charge d−; and d is 1, 2, or 3. Examples of $X^{e+}$ include: ferrocenium, hydrocarbyl-substituted ferrocenium, Ag$^+$, or Pb$^{+2}$. Preferred embodiments of $A^{d-}$ are those anions previously defined with respect to the Bronsted acid containing activators, especially tetrakis(pentafluorophenyl)borate.

Activator Combinations

It is within the scope of this invention that metallocene compounds can be combined with one or more activators or activation methods described above. For example, a combination of activators have been described in U.S. Pat. Nos. 5,153,157; 5,453,410; EP 0 573 120 B1; WO 94/07928; and WO 95/14044. These documents all discuss the use of an alumoxane in combination with a stoichiometric activator.

(iii) Optional Cocatalysts

In addition to these activator compounds, cocatalysts may be used. Aluminum alkyl or organoaluminum compounds which may be utilized as cocatalysts (or scavengers) include, for example, trimethylaluminum, triethylaluminum, tri-isobutylaluminum, tri-n-hexylaluminum, tri-n-octylaluminum, diethyl aluminum chloride, dibutyl zinc, and diethyl zinc and the like. Optionally, methyl alumoxane may be used as a cocatalyst.

Preferably, cocatalyst is present at a molar ratio of cocatalyst metal to transition metal of less than 100:1, preferably less than 50:1, preferably less than 15:1, preferably less than 10:1. In alternate embodiments, the cocatalyst is present at 0 wt %.

Other additives may also be used, as desired, such as one or more scavengers, promoters, modifiers, reducing agents, oxidizing agents, aluminum alkyls, or silanes.

Processes to Produce Polyethylene Having Allyl Chain Ends

This invention also relates to a process to produce polyethylene comprising:

(a) contacting ethylene with the metallocene catalyst system described above (preferably with less than 1000 ppm hydrogen, preferably less than 100 ppm hydrogen, preferably less than 50 ppm hydrogen, preferably less than 10 ppm hydrogen, and optionally, there is 0 wt % hydrogen; preferably the contacting occurs at a temperature in the range of about 40 to about 150° C.; preferably the contacting occurs at a pressure in the range of from about 0.55 to about 2.4 MPa);

(b) obtaining a vinyl terminated polyethylene having:

(i) at least 50% allyl chain ends (preferably 60%, 70%, 80%, 90%, 95%, 96%, 97%, 98%, 99%, or 100%), based on total unsaturations;

(ii) a molecular weight distribution of less than or equal to 4.0 (preferably less than or equal to 3.8, 3.6, 3.5, 3.4, 3.2, 3.0, 2.8, or 2.5);

(iii) a g'(vis) of 0.95 or less (preferably less than 0.93, 0.90, 0.88, or 0.85);

(iv) a Mn ($^1$H NMR) of at least 7,000 g/mol (preferably, at least 10,000 g/mol, 15,000 g/Mol; 20,000 g/mol; 25,000 g/mol; 30,000 g/mol; 45,000 g/mol; 55,000 g/mol; 65,000 g/mol; or 85,000 g/mol; and optionally less than 125,000 g/mol, 120,000 g/mol, 115,000 g/mol, 110,000 g/mol, or 100,000 g/mol); and (v) optionally, a Mn (GPC)/Mn ($^1$H NMR) in the range of from about 0.8 to about 1.2 (preferably from 0.85 to 1.15, 0.90 to 1.10, and 0.95 to 1.00).

Monomers

In embodiments of this invention, where homopolyethylene is produced, the process comprises contacting ethylene and 0 wt % $C_3$ to $C_{40}$ alphaolefin comonomer with a metallocene catalyst system.

In embodiments where an ethylene copolymer is produced, the process comprises contacting ethylene monomer with more than 2 wt % of a $C_3$ to $C_{40}$ alphaolefin monomer; preferably from about 2 wt % to about 20 wt % of a $C_3$ to $C_{40}$ alphaolefin monomer (preferably at least 2 wt % comonomer is used, preferably at least 5 wt %, preferably at least 8 wt %, preferably at least 10 wt %, optionally, preferably less than 20 wt % comonomer is used, preferably less than 15 wt %, preferably less than 12 wt %, or preferably less than 2 wt %).

Useful comonomers include $C_3$ to $C_{40}$ alphaolefin monomers, preferably $C_4$ to $C_{40}$ alphaolefin monomers, preferably $C_5$ to $C_{40}$ alphaolefin monomers, preferably $C_5$ to $C_{20}$ alphaolefin monomers, or $C_3$ to $C_{12}$ alphaolefin monomers. Examples of useful comonomers include propylene, 1-butene, 1-pentene, 1-hexene, 1-heptene, 1-octene, 1-nonene, 1-decene, and 1-undecene.

Processes of this invention can be carried out in any manner known in the art. Any suspension, homogeneous bulk, solution, slurry, or gas phase polymerization process known in the art can be used. Such processes can be run in a batch, semi-batch, or continuous mode. Such processes and modes are well known in the art. Homogeneous polymerization processes are preferred. (A homogeneous polymerization process is defined to be a process where at least 90 wt % of the product is soluble in the reaction media.) A bulk homogeneous process is particularly preferred. (A bulk process is defined to be a process where monomer concentration in all feeds to the reactor is 70 vol % or more.) Alternately, no solvent or diluent is present or added in the reaction medium (except for the small amounts used as the carrier for the catalyst system or other additives, or amounts typically found with the monomer; e.g., propane in propylene).

Suitable diluents/solvents for polymerization include non-coordinating, inert liquids. Examples include straight and branched-chain hydrocarbons such as isobutane, butane, pentane, isopentane, hexanes, isohexane, heptane, octane, dodecane, and mixtures thereof; cyclic and alicyclic hydrocarbons such as cyclohexane, cycloheptane, methylcyclohexane, methylcycloheptane, and mixtures thereof such as can be found commercially (Isopar™); perhalogenated hydrocarbons such as perfluorinated $C_{4-10}$ alkanes, chlorobenzene, and aromatic and alkylsubstituted aromatic compounds such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt %, preferably at 0.5 wt %, preferably at 0 wt % based upon the weight of the solvents.

In a preferred embodiment, the feed concentration for the polymerization is 60 vol % solvent or less, preferably 40 vol % or less, or preferably 20 vol % or less, based on the total volume of the feedstream. Preferably the polymerization is run in a bulk process.

In some embodiments of this invention, the conversion of olefin monomer is at least 10%, based upon polymer yield and the weight of the monomer entering the reaction zone, preferably 20% or more, preferably 30% or more, preferably 50% or more, preferably 80% or more. Conversion is the amount of monomer that is converted to polymer product, and is reported as mol % and is calculated based on the polymer yield and the amount of monomer fed into the reactor.

In some embodiments of this invention, the productivity of the catalyst is at least 50 g/mmol/hour, preferably 500 or more g/mmol/hour, preferably 5000 or more g/mmol/hr, preferably 50,000 or more g/mmol/hr. In some embodiments of this invention, the productivity is 4500 g/mmol/hour or more, preferably 5000 g/mmol/hour or more, preferably 10,000 g/mmol/hr or more, preferably 50,000 g/mmol/hr or more. In other embodiments, the productivity is at least 80,000 g/mmol/hr, preferably at least 150,000 g/mmol/hr, preferably at least 200,000 g/mmol/hr, preferably at least 250,000 g/mmol/hr, preferably at least 300,000 g/mmol/hr. "Catalyst productivity" is a measure of how many grams of polymer (P) are produced using a polymerization catalyst comprising W g of catalyst (cat), over a period of time of T hours; and may be expressed by the following formula: P/(T×W) and expressed in units of gPgcat$^{-1}$ hr$^{-1}$.

Preferred polymerizations can be run at any temperature and/or pressure suitable to obtain the desired vinyl terminated polyethylenes. The polymerization may be run at any suitable temperature, such as at a temperature in the range of from about 40° C. to about 150° C., preferably from about 60° C. to about 120° C.; and at any suitable pressure, preferable pressures may be in the range of from about 0.55 MPa to about 2.4 MPa, preferably from about 0.60 MPa to about 2.2 MPa, or preferably from about 0.65 MPa to about 2.0 MPa.

In a typical polymerization, the run time of the reaction may be up to 300 minutes, preferably in the range of from about 5 to about 250 minutes, or preferably from about 10 to about 120 minutes.

In some embodiments of this invention, vinyl terminated polyethylene may be advantageously produced in the presence of hydrogen. Preferably, ethylene may be contacted with the metallocene catalyst system in the presence of less than 1000 ppm hydrogen, preferably less than 100 ppm hydrogen, preferably less than 50 ppm hydrogen, or preferably less than 10 ppm hydrogen. In other embodiments of this invention, there is 0 wt % hydrogen present. Preferably, the catalyst productivity (calculated as g/mmol catalyst/hr) is at least 20% higher than the same reaction without hydrogen present, preferably at least 50% higher, preferably at least 100% higher.

In a preferred embodiment of the present invention, the catalyst system used in the polymerization comprises no more than one metallocene compound. A "reaction zone" also referred to as a "polymerization zone" is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In a preferred embodiment, the polymerization occurs in one reaction zone.

Cocatalysts such as trimethylaluminum, triethylaluminum, tri-isobutylaluminum, tri-n-hexylaluminum, tri-n-octylaluminum, diethyl aluminum chloride, dibutyl zinc, and diethyl zinc and the like may be used. In some embodiments, the process of this invention is conducted in the absence of or essentially free of any scavengers, such as trimethylaluminum, triethylaluminum, tri-isobutylaluminum, tri-n-hexylaluminum, tri-n-octylaluminum, diethyl aluminum chloride, dibutyl zinc, diethyl zinc, and the like.

Ethylene Polymers

The inventors have surprisingly found that processes of this invention with the selected catalyst system produce ethylene homopolymers and copolymers having high percentages of allyl terminations and a narrow molecular weight distribution.

This invention relates to: a vinyl terminated polyethylene having: (i) at least 50% allyl chain ends (preferably 60%, 70%, 80%, 90%, 95%, 96%, 97%, 98%, 99%, or 100%), based on total unsaturations; (ii) a molecular weight distribution of less than or equal to 4.0 (preferably less than or equal to 3.8, 3.6, 3.5, 3.4, 3.2, 3.0, 2.8, or 2.5); (iii) a g'(vis) of 0.95 or less (preferably less than 0.93, 0.90, 0.88, or 0.85); (iv) an Mn ($^1$H NMR) of at least 7,000 g/mol (preferably at least 10,000 g/mol, 15,000 g/mol, 20,000 g/mol, 25,000 g/mol, 30,000 g/mol, 45,000 g/mol, 55,000 g/mol, 65,000 g/mol, or 85,000 g/mol, and, optionally, less than 125,000 g/mol, 120,000 g/mol, 115,000 g/mol, 110,000 g/mol, or 100,000 g/mol); and (v) a Mn (GPC)/Mn ($^1$H NMR) in the range of from about 0.8 to about 1.2 (preferably from 0.85 to 1.15, 0.90 to 1.10, and 0.95 to 1.00).

In particular embodiments, the copolymer may be an ethylene/propylene, ethylene/butene, ethylene/pentene, ethylene/hexene, or ethylene/octene copolymer.

Vinyl terminated polyethylenes of this invention have at least 50% allyl chain ends (preferably 60%, 70%, 80%, 90%, 95%, 96%, 97%, 98%, 99%, or 100%), based on total unsaturations. The number of allyl chain ends is determined using $^1$H NMR at 120° C. using deuterated tetrachloroethane as the solvent on an at least 250 MHz NMR spectrometer, and in selected cases, confirmed by $^{13}$C NMR. Resconi has reported proton and carbon assignments (neat perdeuterated tetrachloroethane used for proton spectra, while a 50:50 mixture of normal and perdeuterated tetrachloroethane was used for carbon spectra; all spectra were recorded at 100° C. on a Bruker spectrometer operating at 500 MHz for proton and 125 MHz for carbon) for vinyl terminated oligomers in 114 J. AM. CHEM. SOC. 1025-1032 (1992) that are useful herein. Allyl chain ends are reported as a molar percentage of the total number of mols of unsaturated groups (that is, the sum of allyl chain ends, vinylidene chain ends, and vinylene chain ends).

Vinyl terminated polyethylenes of this invention have a molecular weight distribution of less than or equal to 4.0 (preferably less than or equal to 3.8, 3.6, 3.5, 3.4, 3.2, 3.0, 2.8, or 2.5). Vinyl terminated polyethylenes of this invention also have a g'(vis) of 0.95 or less (preferably less than 0.93, 0.90, 0.88, or 0.85).

Mn (GPC), Mw, Mz and g'(vis) were determined using a Gel Permeation Chromatography (GPC) method using a High Temperature Size Exclusion Chromatograph (SEC, either from Waters Corporation, Milford, Mass. or Polymer Laboratories (now part of Varian Inc., available from Agilent Technologies)), equipped with a differential refractive index detector (DRI). Experimental details are described in: T. Sun, P. Brant, R. R. Chance, and W. W. Graessley, 34(19) MACROMOLECULES 6812-6820 (2001) and references therein. Three Polymer Laboratories PLgel 10 mm Mixed-B columns are used. The nominal flow rate was 0.5 cm$^3$/min and the nominal injection volume is 300 μL. The various transfer lines, columns, and differential refractometer (the DRI detector) were contained in an oven maintained at 135° C. Solvent for the SEC experiment was prepared by dissolving 6 grams of butylated hydroxy toluene as an antioxidant in 4 liters of Aldrich reagent grade 1, 2, 4 trichlorobenzene (TCB). The TCB mixture was then filtered through a 0.7 μm glass pre-filter and subsequently through a 0.1 μm Teflon filter. The TCB was then degassed with an online degasser before entering the SEC. Polymer solutions were prepared by placing dry polymer in a glass container, adding the desired amount of TCB, then heating the mixture at 160° C. with continuous agitation for about 2 hours. All quantities were measured gravimetrically. The TCB densities used to express the polymer concentration in mass/volume units were 1.463 g/mL at 25° C. and 1.324 g/mL at 135° C. The injection concentration was from 1.0 to 2.0 mg/mL, with lower concentrations being used for higher molecular weight samples. Prior to running each sample the DRI detector and the injector were purged. Flow rate in the apparatus was then increased to 0.5 mL/minute and the DRI was allowed to stabilize for 8 to 9 hours before injecting the first sample. The concentration, c, at each point in the chromatogram was calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the refractive index increment for the system. The refractive index, n=1.500 for TCB at 135° C. and λ=690 nm. For purposes of this invention and the claims thereto (dn/dc)=0.104 for propylene polymers and ethylene polymers and 0.1 otherwise. Units of parameters used throughout this description of the SEC method were: concentration was expressed in g/cm³, molecular weight was expressed in g/mol, and intrinsic viscosity was expressed in dL/g.

Vinyl terminated polyethylenes of this invention also have a g'(vis) of 0.95 or less (preferably less than 0.93, 0.90, 0.88, or 0.85).

The branching index (g'(vis)) is calculated using the output of the SEC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits, wherein $[\eta]_i$ is the intrinsic viscosity over the chromatographic slices, i.

The branching index g'(vis) is defined as:

$$g'vis = \frac{[\eta]_{avg}}{kM_v^\alpha}$$

where, for purpose of this invention and claims thereto, α=0.695 and k=0.000579 for linear ethylene polymers, α=0.705 k=0.000262 for linear propylene polymers, and α=0.695 and k=0.000181 for linear butene polymers. $M_v$ is the viscosity-average molecular weight based on molecular weights determined by LS analysis. See Macromolecules, 2001, 34, pp. 6812-6820 and Macromolecules, 2005, 38, pp. 7181-7183, for guidance on selecting a linear standard having similar molecular weight and comonomer content, and determining k coefficients and α exponents.

The vinyl terminated polyethylenes may also have an Mn (¹H NMR) of at least 7,000 g/mol (preferably at least 10,000 g/mol, 15,000 g/mol, 20,000 g/mol, 25,000 g/mol, 30,000 g/mol, 45,000 g/mol, 55,000 g/mol, 65,000 g/mol, or 85,000 g/mol, and, optionally, less than 125,000 g/mol, 120,000 g/mol, 115,000 g/mol, 110,000 g/mol, or 100,000 g/mol). ¹H NMR data is collected at 380K in a 5 mm probe in $C_2D_2Cl_4$ or toluene-d8 using a Varian or a Bruker spectrometer with a ¹H frequency of at least 400 MHz (available from Agilent Technologies, Santa Clara, Calif.). For the purpose of the claims, ¹H NMR data is collected at 380K in a 5 mm probe in toluene-d8 using a Bruker spectrometer.

¹H NMR data was recorded using a maximum pulse width of 45° C., 8 seconds between pulses and signal averaging 120 transients. Spectral signals were integrated and the number of unsaturation types per 1000 carbons was calculated by multiplying the different groups by 1000 and dividing the result by the total number of carbons. Mn (¹H NMR) was calculated by dividing the total number of unsaturated species into 14,000, and has units of g/mol.

The chemical shift regions for the olefin types are defined to be between the following spectral regions.

| Unsaturation Type | Region (ppm) | Number of hydrogens per structure |
|---|---|---|
| Vinyl | 4.95-5.10 | 2 |
| Vinylidene (VYD) | 4.70-4.84 | 2 |
| Vinylene | 5.31-5.55 | 2 |
| Trisubstituted | 5.11-5.30 | 1 |

Preferably, the vinyl terminated polyethylene also has a Mn (GPC)/Mn (¹H NMR) in the range of from about 0.8 to about 1.2 (preferably from 0.85 to 1.15, 0.90 to 1.10, and 0.95 to 1.00).

In some embodiments of this invention, the vinyl terminated polyethylene has a density of less than 0.950 g/cc (preferably less than 0.945, 0.940, 0.935, 0.930, 0.925, 0.920, 0.915, or 0.910). For the purpose of the claims, density is measured using ASTM D 1505.

In some embodiments of this invention, the vinyl terminated polyethylene has a melting temperature, Tm, of 100° C. or higher (preferably 105° C. or higher, 110° C. or higher, 115° C. or higher, 120° C. or higher, 125° C. or higher, 130° C. or higher, or 135° C. or higher). In some embodiments of this invention, the vinyl terminated polyethylene has a melting temperature, Tm, of 150° C. or less (preferably 145° C. or less, 140° C. or less, 135° C. or less, 130° C. or less, 125° C. or less, 120° C. or less, or 115° C. or less).

In some embodiments of this invention, the vinyl terminated polyethylene has a crystallization temperature, Tc, of 95° C. or greater (preferably 100° C. or greater, 105° C. or greater, 110° C. or greater, or 115° C. or greater). In other embodiments of this invention, the Tc is 130° C. or less (preferably 125° C. or less, 120° C. or less, 115° C. or less, or 110° C. or less).

In some embodiments of this invention, the vinyl terminated polyethylene has a heat of fusion, Hf, of greater than 95 J/g (preferably greater than 100 J/g, 125 J/g, 150 J/g, 175 J/g or 180 J/g).

Melting temperature ($T_m$) and glass transition temperature (Tg) are measured using Differential Scanning calorimetry (DSC) using commercially available equipment such as a TA Instruments 2920 DSC. Typically, 6 to 10 mg of the sample, that has been stored at 25° C. for at least 48 hours, is sealed in an aluminum pan and loaded into the instrument at 25° C. The sample is equilibrated at 25° C., then it is cooled at a cooling rate of 10° C./min to −80° C., to obtain heat of crystallization (Tc). The sample is held at −80° C. for 5 min and then heated at a heating rate of 10° C./min to 25° C. The glass transition temperature (Tg) is measured from the heating cycle. Otherwise, the sample is equilibrated at 25° C., then heated at a heating rate of 10° C./min to 150° C. The endothermic melting transition, if present, is analyzed for onset of transition and peak temperature. The melting temperatures reported (Tm) are the peak melting temperatures from the first heat unless otherwise specified. For samples displaying multiple peaks, the melting point (or melting temperature) is defined to be the peak melting temperature (i.e., associated with the largest endothermic calorimetric response in that range of temperatures) from the DSC melting trace.

In any embodiment of the invention, the vinyl terminated polyethylenes may have less than 3 wt % of functional groups selected from hydroxide, aryls and substituted aryls, halogens, alkoxys, carboxylates, esters, acrylates, oxygen, nitrogen, and carboxyl; preferably less than 2 wt %, more preferably less than 1 wt %, more preferably less than 0.5 wt %, more preferably less than 0.1 wt %, more preferably 0 wt %, based upon the weight of the oligomer.

Uses of Ethylene Polymers Having Allyl Chain Ends

The ethylene polymers having high percentages of allyl chain ends prepared herein may be functionalized by reacting a heteroatom containing group with the allyl group of the polymer, with or without a catalyst. The reaction product is a functionalized polyethylene, having a modified group (derived from the heteroatom containing group). Examples include catalytic hydrosilylation, hydroformylation, hydroboration, epoxidation, hydration, dihydroxylation, hydrohalogenation, hydroamination, or maleation with or without activators such as free radical generators (e.g., peroxides).

This invention also relates to: a functionalized polyethylene having: (i) at least 50% modified groups (preferably 60%, 70%, 80%, 90%, 95%, 96%, 97%, 98%, 99%, or 100%), based on the sum of the total unsaturations and modified groups; (ii) a molecular weight distribution of less than or equal to 4.0 (preferably less than or equal to 3.8, 3.6, 3.5, 3.4, 3.2, 3.0, 2.8, or 2.5), based on the sum of the modified groups and the unsaturations; and (iii) a g'(vis) of 0.95 or less (preferably less than 0.93, 0.90, 0.88, or 0.85). Preferably, the functionalized polyethylene also has an Mn (GPC) of at least 5,600 g/mol (preferably at least 10,000 g/mol, 15,000 g/mol, 20,000 g/mol, 25,000 g/mol, 30,000 g/mol, 45,000 g/mol, 55,000 g/mol, 65,000 g/mol, or 85,000 g/mol, and, optionally, less than 150,000 g/mol, 120,000 g/mol, 115,000 g/mol, 110,000 g/mol, or 100,000 g/mol). Preferably, the modified group is one or more of an amine, an aldehyde, an alcohol, an acid, a halide, a succinic acid, a maleic acid, and a maleic anhydride.

Preferably, the ethylene polymers having high percentages of allyl chain ends are functionalized as described in U.S. Pat. No. 6,022,929; A. Toyota, T. Tsutsui, and N. Kashiwa, 48 POLYMER BULLETIN 213-219 (2002); 112 J. AM. CHEM. SOC. 7433-7434 (1990); and US 2009-0318646 A1.

The functionalized polymers can be used in blown films, nanocomposites, pigment compositions, in situ compatibilizers (for use, for example, in tie layers), oil additivation, and many other applications. Preferred uses include additives for lubricants and/or fuels.

In particular embodiments of the invention herein, the ethylene polymers having high percentages of allyl chain ends disclosed herein, or functionalized analogs thereof, are useful as additives. In some embodiments, the ethylene polymers having high percentages of allyl chain ends disclosed herein, or functionalized analogs thereof, are useful as additives in a lubricant. Particular embodiments relate to a lubricant comprising the ethylene polymers having high percentages of allyl chain ends disclosed herein, or functionalized analogs thereof.

In other embodiments, the ethylene polymers having high percentages of allyl chain ends disclosed herein may be used as monomers for the preparation of polymer products. Processes that may be used for the preparation of these polymer products include coordinative polymerization and acid-catalyzed polymerization.

EXAMPLES

The following abbreviations are used below: Me is methyl, Pr is n-propyl, Ph is phenyl, Flu is fluorenyl, Ind is indenyl, Bu is n-butyl, and Bz is benzyl. TMA is trimethylaluminum.

MAO is methylalumoxane and TIBAL is triisobutylaluminum. MAO is obtained from Albemarle (Baton Rouge, La.) and TIBAL is obtained from Sigma Aldrich Co. (St. Louis, Mo.), and both were used as received, unless otherwise stated.

All reactions were carried out under inert atmosphere, preferably nitrogen, unless otherwise stated. All solvents were obtained from Sigma Aldrich Co. and dried before use over 3 Å molecular sieves (also obtained from Sigam Aldrich), unless otherwise stated.

Products were characterized by $^1$H NMR and GPC-DRI as follows:

$^1$H NMR $^1$H NMR data was collected at 380K in a 5 mm probe using a Varian or Bruker spectrometer with a $^1$H frequency of 400 MHz (available from Agilent Technologies, Santa Clara, Calif.). Data was recorded using a maximum pulse width of 45°, 8 seconds between pulses and signal averaging 120 transients. Spectral signals were integrated and the number of unsaturation types per 1000 carbons was calculated by multiplying the different groups by 1000 and dividing the result by the total number of carbons. Mn was calculated by dividing the total number of unsaturated species into 14,000, and has units of g/mol.

The chemical shift regions for the olefin types are defined to be between the following spectral regions as described above.

GPC-DRI

Mn, Mw, Mz and g'(vis) were determined using a Gel Permeation Chromatography (GPC) method using a High Temperature Size Exclusion Chromatograph (SEC, either from Waters Corporation, Milford, Mass. or Polymer Laboratories (now part of Varian Inc., available from Agilent Technologies)), equipped with a differential refractive index detector (DRI). Experimental details, are described in: T. Sun, P. Brant, R. R. Chance, and W. W. Graessley, Macromolecules, Volume 34, Number 19, pp. 6812-6820, (2001) and references therein. Three Polymer Laboratories PLgel 10 mm Mixed-B columns are used. The nominal flow rate was 0.5 cm$^3$/min and the nominal injection volume is 300 μL. The various transfer lines, columns and differential refractometer (the DRI detector) were contained in an oven maintained at 135° C. Solvent for the SEC experiment was prepared by dissolving 6 grams of butylated hydroxy toluene as an antioxidant in 4 liters of Aldrich reagent grade 1, 2, 4 trichlorobenzene (TCB). The TCB mixture was then filtered through a 0.7 μm glass pre-filter and subsequently through a 0.1 μm Teflon filter. The TCB was then degassed with an online degasser before entering the SEC. Polymer solutions were prepared by placing dry polymer in a glass container, adding the desired amount of TCB, then heating the mixture at 160° C. with continuous agitation for about 2 hours. All quantities were measured gravimetrically. The TCB densities used to express the polymer concentration in mass/volume units were 1.463 g/mL at 25° C. and 1.324 g/mL at 135° C. The injection concentration was from 1.0 to 2.0 mg/mL, with lower concentrations being used for higher molecular weight samples. Prior to running each sample, the DRI detector and the injector were purged. Flow rate in the apparatus was then increased to 0.5 mL/minute, and the DRI was allowed to stabilize for 8 to 9 hours before injecting the first sample. The concentration, c, at each point in the chromatogram was calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the refractive index increment for the system. The refractive index, n=1.500 for TCB at 135° C. and λ=690 nm. For purposes of this invention and the claims thereto (dn/dc)=0.104 for propylene polymers and ethylene polymers and 0.1 otherwise. Units of parameters used throughout this description of the SEC method were: concentration was expressed in g/cm$^3$, molecular weight was expressed in g/mol, and intrinsic viscosity was expressed in dL/g.

The branching index (g'(vis)) was calculated using the output of the SEC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits. The branching index g'(vis) was defined as:

$$g'vis = \frac{[\eta]_{avg}}{kM_v^\alpha}$$

where, for purpose of this invention and claims thereto, $\alpha$=0.695 and k=0.000579 for linear ethylene polymers, $\delta$=0.705 k=0.000262 for linear propylene polymers, and $\alpha$=0.695 and k=0.000181 for linear butene polymers. $M_v$ is the viscosity-average molecular weight based on molecular weights determined by LS analysis. See Macromolecules, 2001, 34, pp. 6812-6820 and Macromolecules, 2005, 38, pp. 7181-7183, for guidance on selecting a linear standard having similar molecular weight and comonomer content, and determining k coefficients and $\alpha$ exponents.

Example 1

Comparative

Commercially available plastomers were obtained from the sources detailed in Table 1 below.

TABLE 1

PROPERTIES OF COMMERCIALLY AVAILABLE PLASTOMERS

|  | AFFINITY ™ PL 1880 | AFFINITY ™ PL 1450 | EXACT ™ 3128 | TEAMAX ™ 1000F |
|---|---|---|---|---|
| Source | Dow Chemical Co. (Freeport, TX) | Dow Chemical Co. (Freeport, TX) | ExxonMobil Chemical Co. (Baytown, TX) | DSM Engineering Plastics (Birmingham, MI) |
| Polymer | Ethylene-octene copolymer | Ethylene-octene copolymer | Ethylene-hexene copolymer | Ethylene-octene copolymer |
| Melt Index, g/10 mins (ASTM D 1238, 2.16 kg, 190° C.) | 1.03 | 7.5 | 1.04 | 3.16 |
| MIR (ASTM D 1238, $I_{21}/I_2$) | 29.9 | — | 15.9 | 33.6 |
| Melting Point (° C.) | 100 | 98 | 92.4 | 122.6 |
| Density (g/cm$^3$) (ASTM D 1505) | 0.9033 | 0.902 | 0.9011 | 0.9021 |

These polymers were tested by $^1$H NMR to determine the unsaturation (vinyl, vinylene, and vinylidene) content, and by $^1$H NMR and GPC to determine Mn. The results are presented in Table 2 below.

TABLE 2

UNSATURATION CONTENT OF COMMERCIALLY AVAILABLE PLASTOMERS

|  | AFFINITY ™ PL 1880 | AFFINITY ™ PL 1450 | EXACT ™ 3128 | TEAMAX ™ 1000F |
|---|---|---|---|---|
| Vinyls/1000 C. | 0.02 | 0.05 | 0.05 | 0.3 |
| Vinylenes/1000 C. | 0.08 | 0.17 | 0.04 | 0.13 |
| Vinylidenes/1000 C. | 0.05 | 0.35 | 0.11 | 0.17 |
| % vinyl | 13 | 9 | 25 | 50 |
| Mn ($^1$H NMR, kg/mol) | 93 | 24.6 | 70 | 23 |
| Mn (GPC, kg/mol) | 44.7 | — | 50.4 | 20.9 |

The commercial plastomers tested had low vinyl functionality, ranging from 9 to 50%. Additionally, the commercial plastomers tested had a ratio of vinyls:vinylidenes in the range of from about 0.3 to about 1.2. Furthermore, these commercial plastomers, with the exceptions of AFFINITY™ PL 1450 (data not available from GPC) and TEAMAX™ 1000F, had a ratio of Mn ($^1$H NMR)/Mn (GPC) of <1. Without wishing to be bound by theory, the inventors suggest that this may indicate that not every plastomer chain has a vinyl end group.

Example 2

Comparative (with MAO)

The following Metallocene Compound A was used:

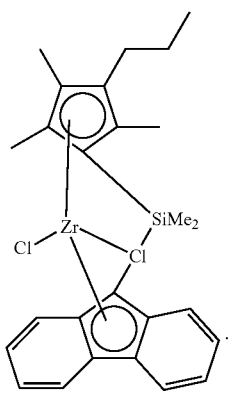

General Polymerization

Into a 2 L stainless steel autoclave reactor was charged 700 mL of hexane. TIBAL (0.5 mL) was added as solution in 2 mL of toluene. 1-Hexene was added (dried over LiAlH$_4$ and filtered over basic Al$_2$O$_3$) to the reactor. Ethylene was added and the reactor was heated to 100° C. with stirring rate set at 1250 rpm. The catalyst was preactivated by mixing with MAO (30 wt % in toluene) in 50 mL of toluene at 25° C. for about 15 minutes. The catalyst system was transferred by syringe to a small stainless steel bomb attached securely to the reactor. The catalyst was then added to the reactor at a rate of about 1 mL/minute. Ethylene was maintained at the initial pressure throughout the polymerization. The polymerization was allowed to proceed for the desired run time at which time the reactor was cooled and excess pressure vented into the hood. The solid resin was transferred into a glass vessel and dried at 80° C. in a vacuum oven for at least 2 hours. The polymerization parameters and yields are presented in Table 3, and the characterization of the resins presented in Table 4.

TABLE 3

POLYMERIZATION CONDITIONS FOR EXAMPLE 2

| Run # | Hexene, mL | Catalyst, mg | Ethylene, psig | Activator (Al/Zr) | Time, mins | Yield, g |
|---|---|---|---|---|---|---|
| 1 | 30 | 4.4 | 115 | 235 | 15 | 45.4 |
| 2 | 30 | 4.5 | 115 | 235 | 3 | 24.6 |
| 3 | 30 | 4.5 | 115 | 235 | 15 | 26.4 |

TABLE 4

CHARACTERIZATION FOR RESINS FROM EXAMPLE 2

| | $^1$H NMR (unsaturations/1000C) | | | | | $^1$H NMR |
|---|---|---|---|---|---|---|
| Run # | Vinylenes (mols) | Other Unsats. (mols) | Vinyls (mols) | Vinylidenes | vinyls (mol %) | Mn, kg/mol |
| 1 | 0.02 | — | 0.06 | 0 | 75 | 130 |
| 2 | 0.02 | — | 0.08 | — | 80 | 140 |
| 3 | 0.02 | — | 0.08 | — | 80 | 140 |

| | GPC | | | | DSC | |
|---|---|---|---|---|---|---|
| | Mn (K), g/mol | Mw (K), g/mol | Mz (K), g/mol | g'(vis) | Tm, ° C. | Hf, J/g |
| 1 | 114 | 234 | 363 | 1.00 | — | — |
| 2 | 130 | 268 | 392 | 1.01 | — | — |
| 3 | 136 | 263 | 396 | 1.00 | — | — |

Example 3

Inventive & Comparative

Table 5 shows the metallocene compounds were used for Example 3.

TABLE 5

METALLOCENE COMPOUNDS USED IN EXAMPLE 3

| Metallocene Compound | Structure |
|---|---|
| B | |
| C | |

TABLE 5-continued

METALLOCENE COMPOUNDS USED IN EXAMPLE 3

| Metallocene Compound | Structure |
|---|---|
| D (comparative) | 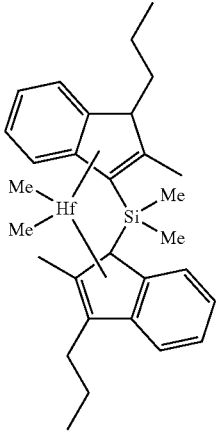 |
| E | 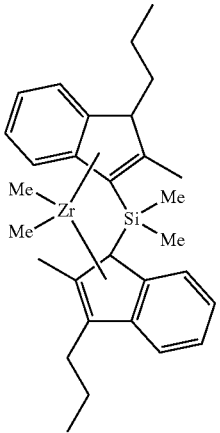 |

General Polymerization

Into a 2 L stainless steel autoclave reactor was charged 1000 mL of isohexane. TIBAL (0.5 mL) was added as solution in 2 mL of toluene. Ethylene (150 psi) was added and the reactor was heated to operating temperature. The catalyst system was provided by mixing the metallocene with dimethylaniliniumtetrakis(heptafluoronthyl)borate (1:1 molar ratio) in 50 mL of toluene at 25° C. for about 15 minutes. The catalyst system was transferred by syringe to a small stainless steel bomb attached securely to the reactor. The catalyst system was added as a "shot" with high pressure $N_2$. Ethylene was maintained at the initial pressure throughout the polymerization. The polymerization was allowed to proceed for the desired run time at which time the reactor was cooled and excess pressure vented into the hood. The solid resin was transferred into a glass vessel and dried at 80° C. in a vacuum oven for at least 2 hours. The polymerization parameters and yields are presented in Table 6, and the characterization of the resins presented in Table 7.

TABLE 7

POLYMERIZATION CONDITIONS FOR EXAMPLE 3

| RUN # | MCN | $C_6$ (mLs) | Tp (° C.) | Time (mins) | Yield (g) | Activity (kg/g cat/hr) |
|---|---|---|---|---|---|---|
| 4 | B | 0 | 100 | 7 | 37 | 105,714 |
| 5 | B | 40 | 84 | 10 | 38 | 38,000 |
| 6 | C | 0 | 100 | 10 | 29 | 29,000 |
| 7 | C | 40 | 120 | 20 | 1 | 1,000 |
| 8 | C | 0 | 120 | 20 | 5 | 5,000 |
| 9 | C | 0 | 120 | 40 | 10 | 5,000 |
| 10 | C | 0 | 120 | 60 | 12 | 4,000 |
| 11 | B | 0 | 120 | 21 | 12 | 11,429 |
| 12 | D | 0 | 120 | 23 | 19 | 16,522 |
| 13 | E | 0 | 110 | 10 | 10 | 10,667 |
| 14 | E | 0 | 110 | 30 | 16 | 20,000 |

The resins produced were characterized by GPC and NMR, and the results were reported in Table 8 below.

TABLE 8

CHARACTERIZATION DATA FOR RUNS 4-14

| | GPC | | | | $^1$H NMR | | | | DSC | | | |
|---|---|---|---|---|---|---|---|---|---|---|---|---|
| | | | | | Other | | | | | | | |
| Run # | Mw, kg/mol | Mn, kg/mol | Mw/Mn | g' (vis) | Mn, kg/mol | Unsats., mol % | Vinyl mol % | VYD* mol % | Tm, ° C. | Tc, ° C. | Hf, J/g | D** g/cc |
| 4 | 167.5 | 67.0 | 2.5 | — | 37.8 | 30 | 70 | 0 | 136.5 | 121.9 | 167 | 0.942 |
| 5 | 120.6 | 60.3 | 2.0 | — | 60 | 29 | 61 | 9 | 118.6 | 99.8 | 98.6 | 0.911 |
| 6 | 218.6 | 70.5 | 3.1 | — | 53.2 | 44 | 56 | 0 | 136.3 | 113.3 | 178 | 0.947 |
| 7 | 93.6 | 21.3 | 4.4 | 0.88 | 23.2 | 4 | 65 | 31 | — | — | — | — |
| 8 | — | — | — | — | 28 | 0 | 100 | 0 | — | — | — | — |
| 9 | 205.6 | 60.4 | 3.4 | 0.87 | 70.1 | 5 | 90 | 5 | — | — | — | — |
| 10 | 216.2 | 76.4 | 2.8 | 0.86 | 40 | 5 | 90 | 5 | 135.6 | 112.1 | 173 | 0.945 |
| 11 | 169.7 | 57.8 | 2.9 | 0.93 | 61 | 10 | 90 | 0 | 134.6 | 113 | 169 | 0.943 |
| 12 | 166.7 | 38.8 | 4.3 | 0.87 | — | 0 | 0 | 0 | 135.5 | 112.8 | 181 | 0.949 |
| 13 | 66 | 11.7 | 5.6 | 0.92 | 8.2 | 30 | 70 | 0 | — | — | — | — |
| 14 | 72.5 | 23.8 | 3.0 | 0.93 | — | — | — | — | — | — | — | — |

*VYD means vinylidene
**D means density

Example 4

Inventive

Preparation of Amine-Functionalized Polyethylene m-Xylene (8 mL) was added to vinyl-terminated polyethylene (0.576 g, Mn 37.8 k (Example 3, Run 4, above), 70% vinyls) in a 20 mL vial. The vial was heated to 135° C. under an inert atmosphere to form a thick homogeneous mixture. N-methylaniline (0.0970 g, 0.907 mmol) and Ta(NMe$_2$)$_5$ (0.0196 g, 0.0488 mmol) were added. The vial was loosely covered with an aluminum cap. After heating for 20 hours much of the xylene had evaporated. Additional xylene (10 mL) was added and the mixture was heated to reflux to afford a thick solution. The solution was poured into methanol (100 mL). The resulting white solid was broken up, collected on a frit, washed with methanol (50 mL), and dried under reduced pressure at 60° C. Yield: 0.55 g. $^1$H NMR (TCE, 500 MHz, 120° C.) δ 7.17 (0.29H, t, m-aryl), 6.70 (0.14H, t, p-aryl), 6.62 (0.28H, d, o-aryl), 5.45 (0.05H, s, vinylene), 3.10 (0.12H, m, N—C(H)H—), 2.95 (0.12H, m, N—C(H)H—), 1.2-1. (2000H, PE). NMR spectroscopic analysis indicates the presence of 0.144 amine groups (based on Ph group resonances) and 0.025 vinylene groups per 1000 carbons in the product. No resonances due to vinyl functional groups were observed.

All documents described herein are incorporated by reference herein, including any priority documents and/or testing procedures to the extent they are not inconsistent with this text, provided however that any priority document not named in the initially filed application or filing documents is NOT incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise, "comprising" encompasses the terms "consisting essentially of," "is," and "consisting of" and anyplace "comprising" is used "consisting essentially of," "is," or "consisting of" may be substituted therefor.

We claim:

1. A process to produce polyethylene comprising:
   (a) contacting ethylene with a metallocene catalyst system;
   wherein the catalyst system comprises:
     (i) a stoichiometric activator;
     (ii) a metallocene compound represented by the formula:

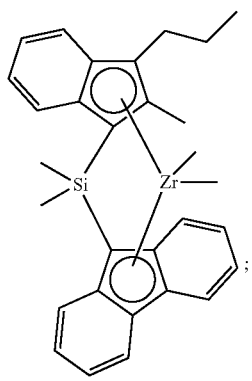

(b) obtaining a vinyl terminated polyethylene having:
     (i) at least 50% allyl chain ends, based on total unsaturations;
     (ii) a molecular weight distribution of less than or equal to 4.0;
     (iii) a g'(vis) of 0.95 or less; and
     (iv) a Mn ($^1$H NMR) of at least 7,000 g/mol.

2. The process of claim 1, wherein the vinyl terminated polyethylene is an ethylene polymer having less than 2 wt % of a C$_3$ to C$_{40}$ alphaolefin comonomer.

3. The process of claim 2, wherein the vinyl terminated polyethylene has at least 60% allyl chain ends, based on total unsaturations.

4. The process of claim 2, wherein the vinyl terminated polyethylene has a molecular weight distribution of less than or equal to 3.5.

5. The process of claim 1, wherein the vinyl terminated polyethylene is an ethylene homopolymer having 0 wt % of a C$_3$ to C$_{40}$ alphaolefin comonomer and has greater than 85% allyl chain ends, based on total unsaturations.

6. The process of claim 1, wherein the vinyl terminated polyethylene comprises 0 wt % of a C$_3$ to C$_{40}$ alphaolefin comonomer.

7. The process of claim 1, wherein the vinyl terminated polyethylene comprises from about 2 wt % to about 20 wt % of a C$_3$ to C$_{40}$ alphaolefin comonomer.

8. The process of claim 7, wherein the vinyl terminated polyethylene has at least 60% allyl chain ends, based on total unsaturations.

9. The process of claim 1, wherein the vinyl terminated polyethylene has a Mn (GPC)/Mn NMR) in the range of from about 0.8 to about 1.2.

10. The process of claim 1, wherein the vinyl terminated polyethylene has a Mn (GPC)/Mn NMR) in the range of from about 0.9 to about 1.1.

11. The process of claim 1, wherein the activator is a bulky activator represented by the formula:

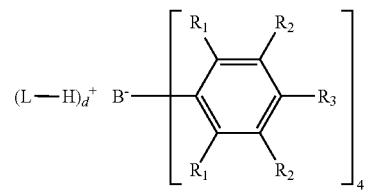

wherein
each R$_1$ is, independently, a halide;
each R$_2$ is, independently, a halide, a C$_6$ to C$_{20}$ substituted aromatic hydrocarbyl group or a siloxy group of the formula —O—Si—R$_a$, where R$_a$ is a C$_1$ to C$_{20}$ substituted or unsubstituted hydrocarbyl or hydrocarbylsilyl group;
each R$_3$ is a halide, C$_6$ to C$_{20}$ substituted aromatic hydrocarbyl group or a siloxy group of the formula —O—Si—R$_a$, where R$_a$ is a C$_1$ to C$_{20}$ substituted or unsubstituted hydrocarbyl or hydrocarbylsilyl group;
wherein R$_2$ and R$_3$ can form one or more saturated or unsaturated, substituted or unsubstituted rings;
L is an neutral Lewis base;
(L-H)$^+$ is a Bronsted acid;
d is 1, 2, or 3;
wherein the anion has a molecular weight of greater than 1020 g/mol; and wherein at least three of the substituents on the B atom each have a molecular volume of greater than 250 cubic A.

12. The process of claim 1, wherein the activator is one or more of:

trimethylammonium tetrakis(perfluoronaphthyl)borate, triethyl ammonium tetrakis(perfluoronaphthyl)borate, tripropylammonium tetrakis(perfluoronaphthyl)borate, tri(n-butyl)ammonium tetrakis(perfluoronaphthyl)borate, tri(t-butyl)ammonium tetrakis(perfluoronaphthyl)borate, N,N-dimethylanilinium tetrakis(perfluoronaphthyl)borate, N,N-diethylanilinium tetrakis(perfluoronaphthyl)borate, N,N-dimethyl-(2,4,6-trimethylanilinium)tetrakis(perfluoronaphthyl)borate, tropillium tetrakis(perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene(diazonium)tetrakis(perfluoronaphthyl)borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(t-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium)tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethyl silylium tetrakis(perfluorobiphenyl)borate, benzene(diazonium)tetrakis(perfluorobiphenyl)borate, [4-t-butyl-PhNMe$_2$H] [(m-C$_6$F$_5$-C$_6$F$_4$)$_4$B].

13. The process of claim 1, wherein the contacting step (a) takes place at a temperature in the range of from about 40° C. to about 150° C.

14. The process of claim 1, wherein the contacting step (a) takes place at a pressure in the range of from about 0.55 MPa to about 2.4 MPa.

15. The process of claim 1, wherein the polyethylene has a g'(vis) of less than 0.90.

16. The process of claim 1, wherein the polyethylene has a g'(vis) of less than 0.85.

17. The process of claim 1, wherein the polyethylene has an Mn of less than 125,000 g/mol.

* * * * *